United States Patent
Ayan et al.

(10) Patent No.: US 9,916,305 B1
(45) Date of Patent: Mar. 13, 2018

(54) TRANSLATING TERMS WITHIN A DIGITAL COMMUNICATION

(71) Applicant: Facebook, Inc., Menlo Park, CA (US)

(72) Inventors: Necip Fazil Ayan, Menlo Park, CA (US); Donald Vincent Husa, Sunnyvale, CA (US); Shawn C. P. Mei, San Francisco, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 15/393,102

(22) Filed: Dec. 28, 2016

(51) Int. Cl.
*G06F 17/28* (2006.01)
*H04L 12/58* (2006.01)

(52) U.S. Cl.
CPC ........ *G06F 17/2836* (2013.01); *G06F 17/289* (2013.01); *H04L 51/32* (2013.01)

(58) Field of Classification Search
USPC ...................................... 704/1–10
See application file for complete search history.

(56) References Cited

U.S. PATENT DOCUMENTS

| 6,233,544 B1 * | 5/2001 | Alshawi | G06F 17/2818 704/2 |
| 2002/0040359 A1 * | 4/2002 | Green | G06F 17/2785 |
| 2008/0243481 A1 * | 10/2008 | Brants | G06F 17/2818 704/9 |

* cited by examiner

*Primary Examiner* — Abul Azad
(74) *Attorney, Agent, or Firm* — Keller Jolley Preece

(57) ABSTRACT

This disclosure covers systems and methods that create references for locating a translation of a term expressed within a digital communication. In particular, in certain embodiments, the disclosed systems and methods create a hashkey to identify a translation (or multiple translations) of an initial term from a source language to a target language. By referring to this hashkey corresponding to the initial term, the disclosed systems and methods can identify a translation (or multiple translations) of the same or similar term within a digital communication to translate a digital communication from a source language to a target language.

20 Claims, 10 Drawing Sheets

TRANSLATING TERMS WITHIN A DIGITAL COMMUNICATION

BACKGROUND

Digital communication systems increasingly provide services to users who speak foreign languages. Indeed, some digital communication systems provide communication services to a user base that uses hundreds of languages to communicate, such as through social media posts, instant messages, and e-mails. As users increasing connect and establish relationships with other users who come from different countries or who speak different languages, they often seek options to translate their communications.

Conventional digital communication systems often fail to provide translation solutions to users. The lack of effective translation solutions may prompt users to seek translations outside of the system or to translate communications. For example, users of conventional digital communication systems may rely on a third-party machine translation services to translate a communication, such as when reading a post from a user in a foreign language. Alternatively, because third-party machine translation services sometimes provide inaccurate translations, a user may create a message in one language and manually translate that message into another language (e.g., by providing a message in multiple languages within the same post on a social networking system).

Although some users of digital communication systems have relied on translation machines to translate communications, conventional translation machines often consume significant processing power and provide inaccurate translations. For example, a conventional translation machine may analyze and translate each communication anew using the same resource intensive process. By translating each digital communication anew, conventional translation machines sometimes perform the same translation of certain words or phrases hundreds, thousands, or more times per day and thereby redundantly perform the same task. Similarly, a conventional translation machine may have limited resources and fail to account for the context of a word or sentence when providing a translation. Indeed, many conventional translation machines are unsuitable for communications within a digital communication system, including social networking systems.

Accordingly, many conventional digital communication systems lack suitable translation solutions and many conventional translation machines lack accurate and efficient translation processes to translate digital communications.

SUMMARY

This disclosure describes solutions to some or all of the foregoing problems with systems and methods that create references for locating a translation of a term expressed within a digital communication. For example, the systems and methods create a hashkey to identify a translation (or multiple translations) of an initial term from a source language to a target language. In some embodiments, the systems and methods determine to translate a new term within a digital communication (e.g., a term that is the same or similar to the initial term) and then create another hashkey as a reference to translate the new term from the source language to the target language. The systems and methods determine that the hashkey that references the new term corresponds (e.g., matches or is similar) to the hashkey that references the initial term. Accordingly, the systems and methods use the hashkey that references the initial term to identify a translation (or multiple translations) for the new term from the source language to the target language.

In certain embodiments, the systems and methods receive a translation of an initial term from a source language to a target language. Based on the translation of the initial term, the systems and methods create a first hashkey that corresponds to the translation of the initial term within the social networking system (e.g., the first hashkey references the initial term, the source language, and the target language). The systems and methods then determine to translate a digital communication (e.g., a post within a social networking system) from the source language to the target language. In response, the systems and methods identify a new term—in the source language—from within the digital communication. The systems and methods further create a second hashkey based on the new term, the source language, and the target language (e.g., the second hashkey references the new term, the source language, and the target language).

Based on determining that the first hashkey corresponds to the second hashkey, the systems and methods locate the translation of the initial term and provide the translation of the initial term as a translation for the new term. For example, in one or more embodiments, the first hashkey is associated with a translation identifier that points to a translation of the initial term within a social graph. Furthermore, in some embodiments, the systems and methods provide the translation of the initial term—as the translation of the new term—after selecting from multiple potential translations of the initial term.

The systems and methods described above provide a translation solution that avoid the inefficiencies of a conventional translation machine that translates a term anew with each communication. Instead of processing each communication through machine translation, the disclosed systems and methods create hashkeys corresponding to terms—and translations from one language to another—to function as a reference for future translations of the same or similar terms. Accordingly, the systems and methods provide a translation solution that reduces the amount of processing and memory used for translating.

In addition, in one or more embodiments, the systems and methods further provide a more accurate translation of terms than conventional translation machines or other sources of translation for a social networking system. For example, in some embodiments, the disclosed systems and methods generate scores for multiple potential translations of a term—based on, for example, a user appraisal of a translation or a trust level for a translation source—and provide the highest scoring translation of that term corresponding to a hashkey. Additionally, in some embodiments, the disclosed systems and methods identify segments within a sentence for translation and create and compare hashkeys for the segments to identify prior translations with the highest scoring translation of terms corresponding to the segments.

The following description sets forth additional features and advantages of the social networking system. Some of these additional features and advantages will be obvious from the description or may be learned by the practice of such embodiments. A person of ordinary skill in the art may realize and obtain the features and advantages of these embodiments through the systems and methods particularly pointed out in the appended claims.

BRIEF DESCRIPTION OF THE DRAWINGS

Below is a brief description of the figures this disclosure references.

DETAILED DESCRIPTION

Figure 1:
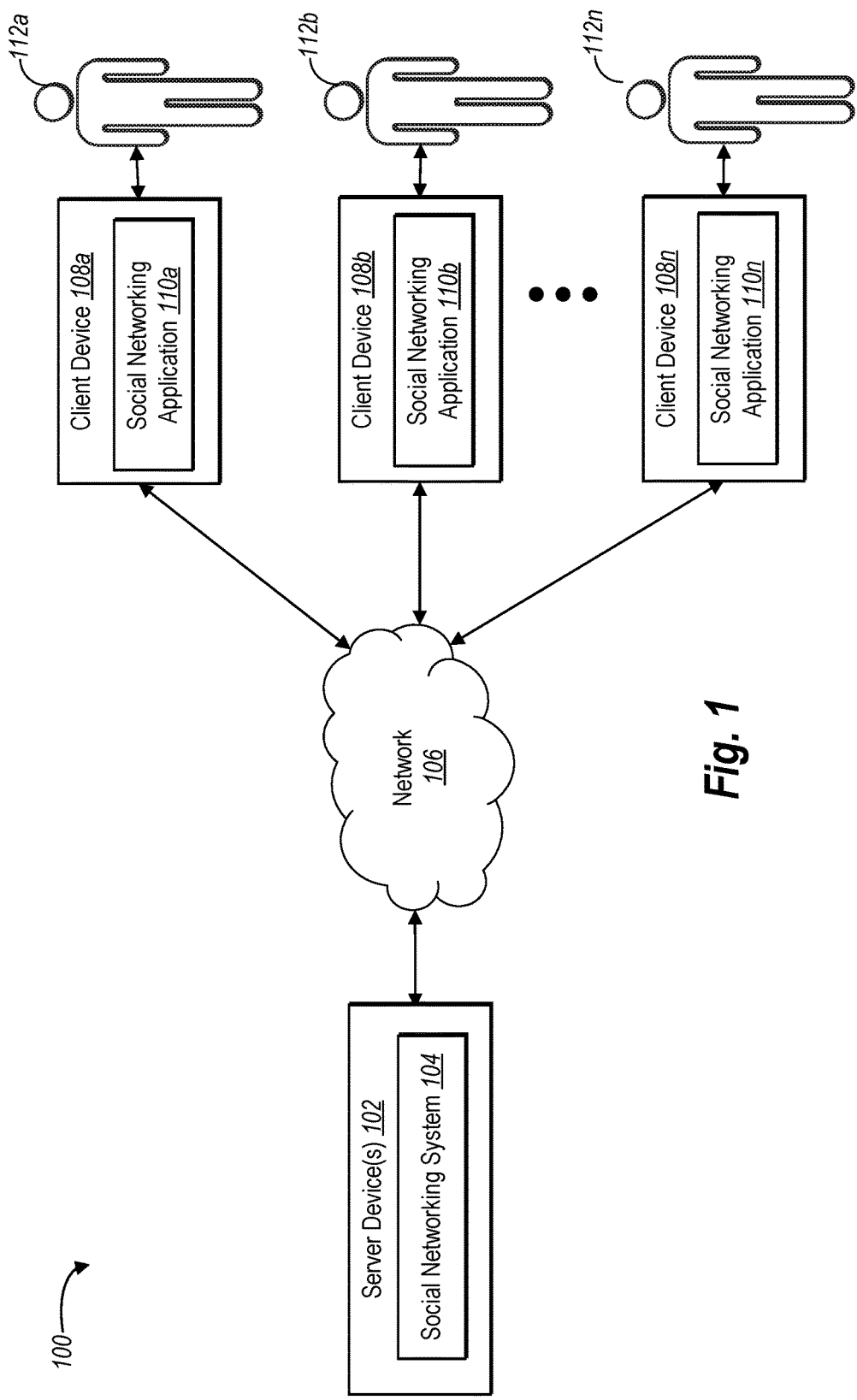
FIG. 1 illustrates a block diagram of an environment for implementing a social networking system in accordance with one or more embodiments.

This disclosure describes one or more embodiments of a digital communication system that creates references for locating a translation of a term expressed within a digital communication. For example, in some embodiments, a digital communication system creates a hashkey to identify a translation of an initial term from a source language to a target language. In some embodiments, the digital communication system creates another hashkey as a reference to translate a new term—that is the same or similar to the initial term—from the source language to the target language. Based on the hashkey corresponding to the new term indicating a match or similarity to the hashkey corresponding to the initial term, the digital communication system identifies and provides the translation of the initial term as a translation for the new term.

For purposes of explanation, this disclosure primarily describes example embodiments of a digital communication system as a social networking system. The social networking system discussed below in detail, however, is simply representative of other possible types of digital communication systems (e.g., email systems, IM systems, SMS systems, and/or other systems that facilitate digital communications between users). Accordingly, based on the disclosure herein, one skilled in the art will appreciate that the systems, methods, processes, functions, and results discussed throughout this disclosure with respect to a social networking system can be performed and achieved in various other types of digital communication systems.

In one or more embodiments, a social networking system receives a translation of an initial term from a source language to a target language. The social networking system may receive the translation from either internal or external sources. For example, the translation may come from an internal translation machine, a user of the social networking system, from an external translation machine, or professional translation service.

Based on receiving the translation of the initial term from the source language to the target language, the social networking system creates a first hashkey and associate the first hashkey with a translation identifier within a relational database of the social networking system. Generally, the translation identifier points to a location of the translation of the initial term (e.g., identifies a node within a social graph that includes the translation). Accordingly, the social networking system can use an indication of the first hashkey to locate a translation using the translation identifier within the relational database.

More specifically, when the social networking system determines to translate a digital communication from the source language to the target language, the system identifies a new term—in the source language—from within the digital communication. Similar to the process of creating the first hashkey, in certain embodiments, the social networking system creates a second hashkey based on the new term, the source language, and the target language. Upon determining that the first hashkey corresponds to the second hashkey, the social networking system uses the translation identifier to locate the translation of the initial term and provides the translation of the initial term as a translation for the new term. In one or more embodiments, the social networking system provides, as the translation of the new term, the translation of the initial term based on selecting a favored or highest rated translation from multiple potential translations of the initial term.

By using hashkeys as references for translations, the social networking system provides an efficient and flexible process of translating terms within digital communications of the system. To avoid using the processing power that conventional translation machines use to translate each term anew, the social networking system creates hashkeys corresponding to terms (translated from one language to another) to function as a reference for future translations of the same or similar terms. This hashkey referencing avoids redundantly recognizing and translating the same term from different digital communications over and over again, as is the case with most conventional machine translation. While preserving processing power, the social networking system also provides a flexible translation process that selects which translation to provide based on a hashkey that corresponds to multiple translations of the same or similar term.

In addition, by using hashkeys as references for translations, the social networking system further provides a faster and more accurate translation of terms than conventional machine translation or other sources of translation. For example, in some embodiments, the social networking system avoids the processing time inherent within conventional machine translations by retrieving a prior translation of a term corresponding to a hashkey for the translation of the same or similar term.

Using hashkeys for a translation of the same or similar term also promotes accuracy and consistency. Indeed, in some embodiments, the social networking system generates scores for multiple potential translations of a term, where the multiple potential translations correspond to a single hashkey, and the scores are based on, for example, a user appraisal of a translation or a trust level for a translation source. Accordingly, upon generating scores, the social networking system provides the translation with the highest score as a translation for a term corresponding to the hashkey. Therefore, the social networking system can provide increased translation accuracy overtime based on considering the accuracy and characteristics of past translations to predict a more accurate translation.

In some embodiments, an expanded translation process further expedites and improves the accuracy of translating a sentence within a digital communication of the system. For example, the social networking system identifies (for translation) segments within a sentence of a digital communication. In such embodiments, the social networking system then creates and compares hashkeys for the segments to identify prior translations with the highest scoring translation of terms corresponding to the segments. Moreover, in one or more embodiments, the social networking system combines or divides segments from a sentence to produce a more accurate translation of a sentence. Similarly, in some embodiments, the social networking system generate scores for multiple potential translations of the sentence to provide an accurate translation of the sentence based on the translation associated with the highest score.

As an additional advantage, the social networking system integrates and uses the resources of a social graph within the system to translate terms. From example, in some embodiments, the social networking system use a social graph to identify and improve a translation of a term. Indeed, in some embodiments, the social networking system creates nodes within the social graph that represent and include translations. In some such embodiments, the social networking system can associate a single hashkey with multiple translation identifiers that point to multiple nodes within a social graph that each include a potential translation. Additional features and advantages will be discussed further below with reference to the figures.

For purposes of explanation, this disclosure uses several terms with the following definitions. The term "digital communication" refers to any communication sent to or received by a digital communication system. For example, a digital communication includes, but is not limited to, an e-mail, comment, instant message, page message, poke, post, private message, rating, reaction, tag, text message, or digital media share sent by or received from a social networking system. In some embodiments, a digital communication includes a word or a phrase in a source language that can be translated to a corresponding word or phrase in a target language.

As used herein, a "term" generally refers to a portion of text within a digital communication. For instance, a term can include a word or a phrase. For example, a term can include a single word (e.g., house). Alternatively, a term can include a combination of words or a phrase (e.g., White House). Moreover, a term can be or include elements of punctuation (e.g., exclamation points, question marks, commas, periods, etc.). In other examples, a term can include an acronym (e.g., "ROFL"). Accordingly, a term can refer to a portion of text to be translated from a source language to a target language.

As used herein, a "sentence" refers to one or more terms and/or one or more phrases within a communication. For example, a sentence may include multiple terms within a digital communication, such as a communication that states, "What are you doing?" Conversely, a sentence may also include a single term or a single phrase, such as a communication that simply states "Hello."

The term "source language," as used herein, refers to an original language in which a term, sentence, or other communication was expressed. For example, the source language of this disclosure is English. The source language of an original post on a timeline that asks, "¿Cómo estás?" is Spanish. In some instances, the source language includes a particular dialect of the original language in which a term, sentence, or other communication was expressed, such as Spanish (Mexico) or Spanish (Spain).

Conversely, the term "target language" refers to a language into which a term, sentence, or other communication is translated or is intended to be translated. For example, when a social networking system determines to translate a post on a timeline that asks, "¿Cómo estás?" from Spanish to English, the target language is English. As with the source language, in some instances, the target language includes a particular dialect of the language into which a term, sentence, or other communication is translated or is intended to be translated.

The term "hashkey" refers to digital data that represents an instruction to translate a term from a source language to a target language. For example, in some embodiments, a hashkey may include a code that represents the source language (e.g., a code of "EN" for English), a code that represents the target language (e.g., a code of "ES" for Spanish), and a reference term that represents a term to be translated. In other embodiments, a hashkey may include an identifier that represents translating from a source language to a target language (e.g., a unique alphanumeric identifier that represents translating from English to Spanish).

As suggested above, a "reference term" refers to a part of a hashkey that corresponds to a term to be translated. The term to be translated may be identical to, or differ from, the reference term in a hashkey. For example, the reference term of "congratulations" may correspond to a term of "congrats" within a digital communication marked for translation. But the reference term of "congratulations" may also simply correspond to a term of "congratulations" within a digital communication marked for translation. As additional examples, a reference term of "Happy Birthday" may correspond to a term of "HBD" within a digital communication or a reference term of "totally" may correspond to a term of "totes" within a digital communication.

The term "translation identifier" refers to a unique identifier for a translation of a term from a source language into a target language. For instance, the translation identifier can be a link or other pointer that identifies a translation of a particular term. For example, a translation identifier may point to a translation of a term located at a node within a social graph. A translation identifier may include, but is not limited to, any symbol, digit, letter, code, or combination of such elements.

Turning now to the figures, FIG. 1 illustrates a block diagram of one embodiment of a system environment 100 in which a social networking system 104 operates. As illustrated in FIG. 1, the system environment 100 includes server device(s) 102, which include the social networking system 104. The system environment 100 further includes client devices 108a, 108b, through 108n (collectively referred to herein as "client devices 108"). As depicted in FIG. 1, each of the client devices 108 have an associated user 112—with a user 112a associated with the client device 108a, a user 112b associated with the client device 108b, and a user 112n associated with the client device 108n (collectively referred to as "users 112"). Users 112 may be humans, organizations, organization members, or any other entities. Although FIG. 1 illustrates a particular number of client devices 108 and a respective number of associated users 112, the system environment 100 may include any number of client devices and any number of users.

As illustrated in FIG. 1, the client devices 108 can communicate with the server device(s) 102, including the social networking system 104, over a network 106. Additional details related to the social networking system are discussed below with reference to FIGS. 8-9. In addition, the network 106 may represent a network or collection of networks, such as the Internet, a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Thus, the network 106 may be any suitable network over which the client devices 108 (or other components) may access the social networking system 104 or vice versa.

As described below, the server device(s) 102 can enable the various functions, features, processes, methods, and systems described herein using, for example, the social networking system 104. Additionally, or alternatively, the server device(s) 102 coordinate with the client devices 108 to perform or provide the various functions, features, processes, methods, and systems described in more detail below. Although FIG. 1 illustrates a particular arrangement of the server device(s) 102, social networking system 104, network 106, and client devices 108, various additional arrangements are possible. For example, the social networking system 104 and the server device(s) 102 may directly communicate with the client devices 108 and thus bypass the network 106.

Generally, the client devices 108 can include any one of various types of client devices. For example, the client devices 108 can include a mobile device (e.g., a smart phone), tablet, laptop computer, desktop computer, television, or any other type of computing device as further explained below with reference to FIG. 7. Additionally, the server device(s) 102 can include one or more computing devices including those explained below with reference to FIG. 7. The server device(s) 102, social networking system 104, network 106, and client devices 108 may communicate using any communication platforms and technologies suitable for transporting data and/or communication signals, including any known communication technologies, devices, media, and protocols supportive of data communications, examples of which are described below with reference to FIG. 8.

As an overview of the system environment 100, the server device(s) 102 provide the client devices 108 access to the social networking system 104 through the network 106. In one or more embodiments, by accessing the social networking system 104, the client devices 108 send one or more digital communications (e.g., posts, instant messages, comments) to the social networking system 104, including digital communications that contain one or more terms and/or sentences that the system 104 determines to translate. The social networking system 104 can provide, for example, a website that enables one of the users 112 to post, send, edit, delete, or perform other actions with respect to digital communications within the social networking system 104.

Alternatively, the client devices 108 communicate with the social networking system 104 via a dedicated application on the client device 108. In particular, and as further shown in FIG. 1, each client device 108 has an associated social networking application 110—with a social networking application 110a associated with the client device 108a, a social networking application 110b associated with the client device 108b, and a social networking application 110n associated with the client device 108n. In some embodiments, the social networking application 110a comprises a web browser, applet, or other software application (e.g., a native application) available to the client device 108a. The client device 108a may launch the social networking application 110a to facilitate interacting with the social networking system 104. For example, the social networking application 110a may coordinate communications between the client device 108a and the server device(s) 102 that, for example, access webpages of the social networking system 104 or send digital communications within the system 104.

To facilitate user interaction with the social networking system 104, the social networking application 110a can provide a graphical user interface of the social networking system 104; receive indications of interactions of the user 112a with the graphical user interface; and perform various requests, queries, or respond to other user input. For example, based on receiving an indication of an interaction between the user 112a with the graphical user interface provided via client device 108a (e.g., a user selection to view a post within a source language), the social networking system 104 can determine that the source language of the post does not match the language of the user 112a. Accordingly, the social networking system 104 generates a request to translate the post (e.g., translate the terms within the post) from the source language of the post to the target language of the user 112a. Based on the request, the social networking system 104 locates translations of the terms (e.g., locate translations within a social graph) and ultimately determines a translation for the post in the target language. The social networking system 104 then provides the translation for the post in the target language to the client device 108a.

Figure 2A:
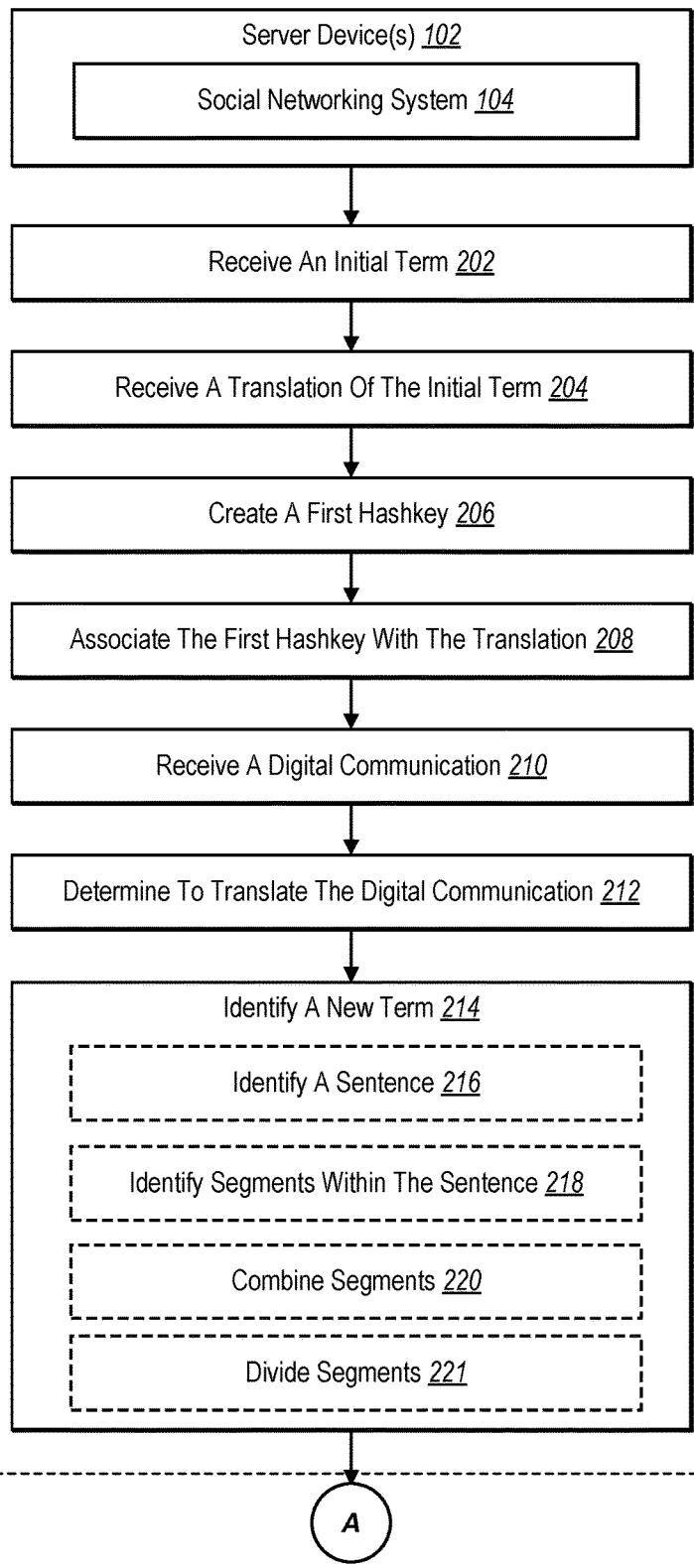
FIGS. 2A-2B illustrate sequence-flow diagrams of creating hashkeys as references for locating a translation of a term in accordance with one or more embodiments of the social networking system.
Figure 2B:
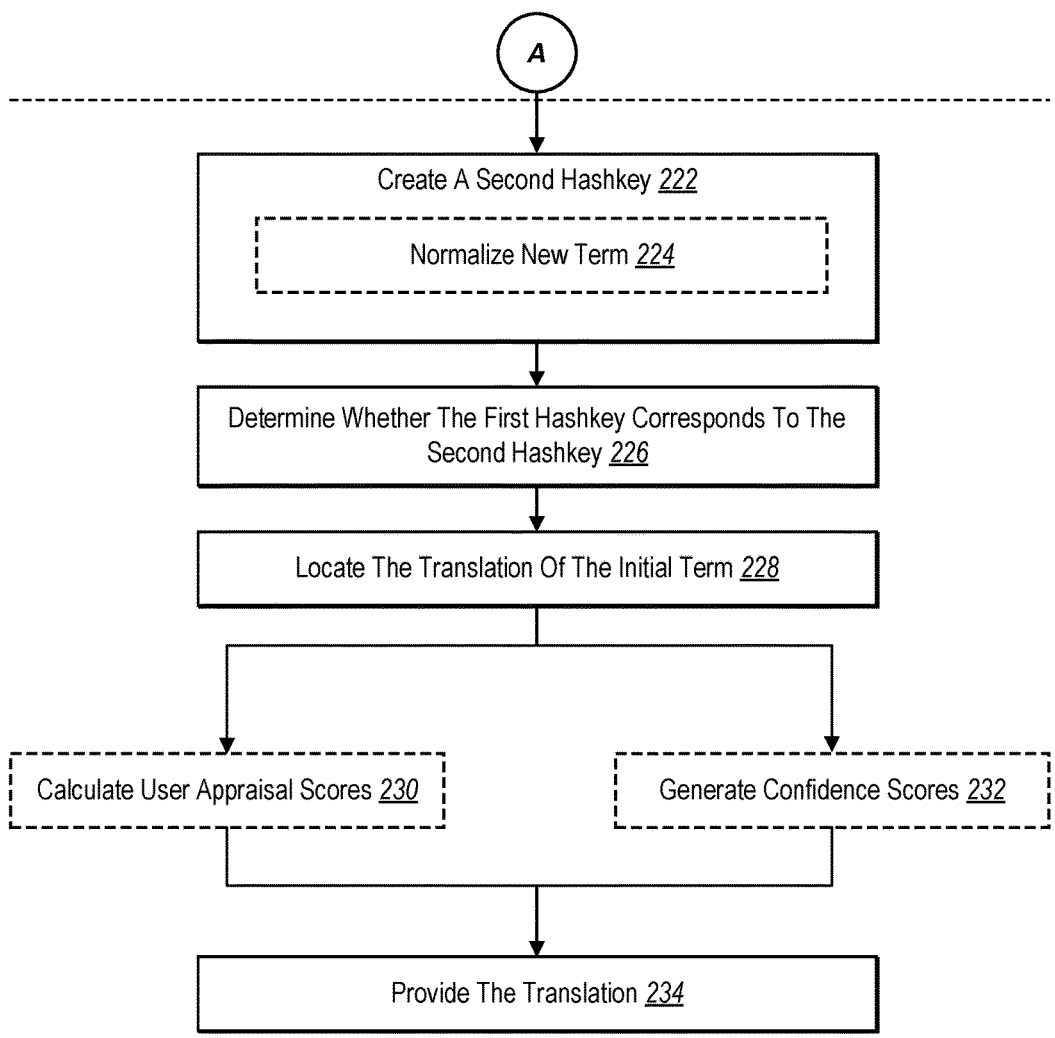

Turning now to FIGS. 2A-2B, these figures illustrate a representation of a sequence of acts 202-234 that the social networking system 104 performs to provide a translation of a term based on hashkeys. For instance, in some embodiments, the social networking system 104 include computer-executable instructions that, when executed by a processor of the server device(s) 102, cause the server device(s) 102 of the social networking system 104 to perform acts 202-234 shown in the sequence-flow diagram of FIGS. 2A-2B.

Consistent with the disclosure above, in some embodiments, the social networking system 104 receives an initial term from a variety of sources and in a variety of formats. As shown in FIG. 2A, the server device(s) 102 of the social networking system 104 perform the act 202 of receiving an initial term. For example, act 202 can include the server device(s) 102 receiving a digital communication—that includes the initial term in a source language—from the client device 108a over the network 106. Alternatively, or additionally, in some embodiments, act 202 can include the server device(s) 102 receiving the initial term in a source language from another computer device or a computer-readable storage medium that includes a list of terms in the source language (e.g., a library of commonly used English terms in digital communications sent within social networking systems). In some embodiments, the server device(s) 102 receive a data input that includes the initial term (e.g., an employee operating the social networking system 104 inputting a collection of terms within a database of the system 104).

Additionally, in some embodiments of the social networking system 104, the server device(s) 102 receive a translation of the initial term from one or more sources. As shown in FIG. 2A, for example, the server device(s) 102 perform the act 204 of receiving a translation of the initial term. Similar to act 202, act 204 can include the server device(s) 102 receiving the translation of the initial term in a target language from one of the client devices 108, a translation service or database, or other data input. Regardless of whether the translation comes from one of the client devices 108 or some other source, sources of the translation of the initial term in the target language also include, but are not limited to, a professional translation service, a translation machine, one of the users 112 of the social networking system 104 (e.g., via one of the client devices 108), or an administrator of the social networking system 104.

In some embodiments, act 204 can include the server device(s) 102 receiving the translation of the initial term from the same source and in the same format as the initial term itself. For example, the server device(s) 102 may receive the initial term—and the translation of the initial term—from a post on a timeline from the client device 108*a* (e.g., a post that includes a sentence in a source language and a translated sentence in a target language, where both sentences communicate the same meaning). In other embodiments, when performing act 204, the server device(s) 102 receive the translation of the initial term from a different source (or in a different format) than the initial term. For example, the server device(s) 102 may receive the initial term in a source language from a digital communication of the client device 108*a* and receive the translation of the initial term in a target language from a computing device of a professional translation service (or a translation machine integrated within the social networking system 104).

Relatedly, in some embodiments, the server device(s) 102 receive multiple translations of the initial term in the target language. In such embodiments, the social networking system 104 may select one of multiple potential translations of an initial term when providing a translation. For example, in some embodiments, the server device(s) 102 receive a first translation of the initial term and a second translation of the initial term. Similar to embodiments that receive a single translation, the server device(s) 102 may receive multiple translations from the same or different sources as the initial term or another translation of the initial term.

Conversely, the server device(s) 102 may receive multiple translations in the same or in different formats as the initial term or another translation of the initial term. For example, in some embodiments, the server device(s) 102 receive the first translation of the initial term in the target language from a post of user 112*a* of the social networking system 104 and the second translation of the initial term in the target language from a computing device of a professional translation service. While the preceding examples describe a first and second translation of the initial term, additional embodiments receive any number of translations of the initial term (or any term).

After receiving an initial term and at least one translation of the initial term, in some embodiments, the social networking system 104 creates a hashkey for locating translations of the initial term. As shown in FIG. 2A, for example, the social networking system 104 performs the act 206 of creating a first hashkey. When performing act 206, for example, the social networking system 104 creates a first hashkey based on the initial term, the source language, and the target language. In such embodiments, the social networking system 104 creates a first hashkey that includes a source language code corresponding to the source language (e.g., a code of "EN" for English), a target language code corresponding to the target language (e.g., a code of "ES" for Spanish), and a reference term corresponding to the initial term (e.g., a reference term of "congratulations" corresponding to an initial term of "congrats" being translated). In other embodiments, the social networking system 104 creates a first hashkey that includes an identifier that represents an instruction to translate a term from the source language to the target language (e.g., a unique code of alphanumeric digits or letters and symbols that represents translating from English to Spanish) and a reference term (e.g., a reference term of "In My Opinion" corresponding to an initial term "IMO").

Additionally or alternatively, when performing act 206, the social networking system 104 optionally creates a first hashkey that is additionally based on a context. As used in this disclosure, the term "context" refers to a topic associated with a term or digital communication, including, but not limited to, topics of entertainment, finance, food, health, life events, occupation, politics, real estate, sports, or style. For example, a translation source (e.g., a professional translation service or a translation machine) may identify a context associated with a term as finance or health.

Accordingly, in some embodiments, the social networking system 104 creates a first hashkey that includes a context code corresponding to a context associated with a term (e.g., a three-letter code of "FIN" for finance or a three-letter code of "HEA" for health), a source language code corresponding to the source language (e.g., a two-letter code of "EN" for English), a target language code corresponding to the target language (e.g., a two-letter code of "ES" for Spanish), and a reference term corresponding to the initial term (e.g., a reference term of "genetically modified organism" corresponding to an initial term of "GMO" being translated). All together, one such first hashkey may be "HEA+EN+ES+Genetically Modified Organism." In some embodiments, when the translation source has not identified a context, the social networking system 104 optionally creates a first hashkey that includes a generic context code (e.g., a three-letter code of "GEN" for generic).

As noted above, in certain embodiments, the social networking system 104 associates a hashkey with a translation. In some embodiments, the social networking system 104 associates a hashkey with a translation by using a translation identifier. As shown in FIG. 2A, for example, the social networking system 104 performs act 208 of associating the first hashkey with the translation. Act 208 can include, for example, the social networking system 104 associating the first hashkey with a translation identifier used to locate a particular translation of a term (e.g., within a social graph). In some embodiments, for example, the social networking system 104 associates the first hashkey with a translation identifier within a relational database of the system 104. The translation identifier points to a translation of the initial term within the social networking system.

As briefly mentioned, a translation identifier can also facilitate integrating a social graph of the social networking system 104 to translate terms. For example, in some embodiments, the social networking system 104 creates a node—within a social graph of the social networking system 104—that represents and/or includes a translation of the initial term. In some embodiments, the translation identifier points to the node that represents and includes the translation of the initial term. By pointing to the node, the translation identifier signals a location of a particular translation of the initial term within the social graph.

While the preceding examples describe a single translation identifier that points to a translation of the initial term, the social networking system 104 optionally receives and stores multiple translations of the initial term (or any other term). When performing act 208, in some embodiments, the social networking system 104 associates the first hashkey with multiple translation identifiers that each point to a different translation of the initial term, such as a first translation identifier and a second translation identifier that point to a first translation and a second translation, respectively. The social networking system 104 can associate a hashkey with as many translation identifiers as translations of the initial term that the system 104 has received, such as first, second, third, fourth, and fifth translation identifiers that each point to different nodes that each include a different translation of the initial term from the source language to the target language.

While in some embodiments the social networking system 104 uses translation identifiers, in other embodiments, the social networking system 104 uses nodes and edges of a social graph to associate a hashkey with a translation of a term. For example, in certain embodiments, the social networking system 104 creates a node—within the social graph of the social networking system 104—that represents and includes the first hashkey. The social networking system 104 then generates an edge that associates the node representing the first hashkey with a node representing the translation of the initial term. In other words, the edge connects the node representing the first hashkey to the node representing the translation of the initial term within the social graph.

Similar to associating a hashkey with multiple translation identifiers, in one or more embodiments, the social networking system 104 associates the node representing the first hashkey with multiple nodes that each represent and include a translation of the initial term. For example, the social networking system 104 may use multiple edges to connect the node representing the first hashkey with nodes that respectively represent and include a first translation of the initial term, a second translation of the initial term, and a third translation of the initial term.

As noted above, the social networking system 104 uses hashkeys to translate terms within digital communications. Before doing so, in some embodiments, the social networking system 104 receives and determines to translate digital communications. As shown in FIG. 2A, for example, the server device(s) 102 perform act 210 of receiving a digital communication in a source language, and the social networking system 104 performs act 212 of determining to translate the digital communication from a source language to a target language. Performing the act 210 can include the server device(s) 102 receiving a digital communication from any of the sources from which the initial term may be received (e.g., receiving a digital communication from one of the client devices 108).

In one or more embodiments, the act 212 of determining to translate a digital communication can include the social networking system 104 determining to translate a digital communication based on a variety of inputs. For example, in some embodiments, the social networking system 104 determines to translate a digital communication in a source language based on a request from one of the client devices 108 to translate the digital communication into a target language. As another example, the social networking system 104 determines to translate a digital communication by detecting that the client device 108a has requested to access the digital communication and that the user 112a associated with the client device 108a predominantly communicates in a target language (e.g., detecting that the client device 108a has requested to access a comment, e-mail, instant message, post, or private message written in English and that the user 112a predominantly communicates in Spanish).

Alternatively, in some embodiments, the social networking system 104 determines to translate a digital communication by detecting that the user 112a who wrote the digital communication in a source language is connected to at least another user (e.g., user 112b) who predominantly communicates in a target language. For example, the user 112a may have a relationship with user 112b reflected in a social graph of the social networking system (e.g., an edge representing a friendship between a node representing the user 112a and a node representing user 112b). Under such circumstances, the social networking system 104 may translate the digital communication before detecting that the client device 108b associated with user 112b has requested to access the digital communication.

After determining to translate the received digital communication from a source language to a target language, in certain embodiments, the social networking system 104 performs act 214 of identifying a new term. In performing this act, the social networking system 104 identifies the new term for the purpose of translating it from the source language to the target language. For example, the act 214 can include identifying a new term from within the received digital communication described in act 210. In some embodiments of act 214, the new term or the digital communication (or both) are written in the same source language as the initial term. Additionally or alternatively, in some embodiments of act 214, the new term is identical to or different from the initial term.

As part of act 214, the social networking system 104 identifies the new term from a variety of contexts. The social networking system 104, in some embodiments, identifies the new term as the only term within the received digital communication (e.g., a post that says "Happy Birthday"). Alternatively, in some embodiments, the social networking system 104 identify the new term from within a sentence of the digital communication. As indicated by FIG. 2A, acts 216, 218, 220, and 221 are optional acts that relate to the act 214 of identifying a new term. For example, and as shown in FIG. 2A, the social networking system 104 performs optional act 216 of identifying a sentence. In some embodiments, act 214 can include the social networking system 104 identifying a sentence from the received digital communication where the received digital communication includes a single sentence or multiple sentences.

Upon identifying a sentence from within the received digital communication, the social networking system 104 can proceed to translate the sentence as described with respect to FIG. 2B. In other embodiments, however, the social networking system 104 performs additional optional acts. For example, and as shown in FIG. 2A, the social networking system 104 performs optional act 218 of identifying segments within the sentence. As used in this disclosure, the term "segment" refers to a part of a sentence, such as a word or phrase within a sentence. The social networking system 104 may identify any number of segments within the sentence, such as a first segment, a second segment, etc.

In some embodiments that identify multiple segments, the social networking system 104 further identifies terms based on those segments. For example, the social networking system 104 can identify the new term based on the first segment and an additional new term based on the second segment. In the preceding examples, the first segment may include the new term alone or contain the new term and other words or phrases. Similarly, the second segment may include the additional term alone or contain the additional term and other words or phrases.

In addition to identifying multiple segments within a sentence, in some embodiments, the social networking system 104 combines or divides segments. When combining segments, the social networking system 104 combines words or phrases of a sentence to identify potential terms or other parts of a sentence (e.g., a noun, subject, verb, object, or prepositional phrase). As shown in FIG. 2A, for example, the social networking system 104 performs the optional act 220 of combining segments. In some embodiments, the act 220 can include the social networking system 104 combining some (or all) of the segments identified in act 218. For instance, the social networking system 104 may combine a first segment and a second segment. The social networking system 104 may also identify the new term (or the additional term) based on the combination of the first and second segments (e.g., identifying a new term of "ides of march" within the combination of a first segment of "ides" and second segment of "march"). While this disclosure describes first and second segments, the social networking system 104 can identify and combine any number of segments from within a sentence.

When dividing segments, the social networking system 104 divides phrases of a sentence to identify potential terms or other parts of a sentence (e.g., a subject, verb, or object). As shown in FIG. 2A, for example, the social networking system 104 performs the optional act 221 of dividing segments. In performing this act, for example, the social networking system 104 divides some (or all) of the segments identified in act 218. For instance, the social networking system 104 may divide a first segment. The social networking system 104 may also identify the new term (or the additional term) based on the division of the first segment (e.g., identifying the new term within part of the first segment).

Once the social networking system 104 has identified a new term from within a digital communication that the system 104 has determined to translate, the social networking system 104 relies on hashkeys to facilitate translating the new term. As shown in FIG. 2B, for example, the social networking system 104 performs the act 222 of creating a second hashkey. When performing act 222, the social networking system 104 creates the second hashkey using the same (or a similar) process for creating the first hashkey described above. Accordingly, act 222 can include the social networking system 104 creating the second hashkey based on the new term, the source language, and the target language (e.g., a second hashkey that includes a reference term, a source language code, and a target language code) or further based on a context associated with a digital communication (e.g., a second hashkey that includes a reference term, a context code, a source language code, and a target language code).

In some embodiments—where the social networking system 104 creates a second hashkey based in part on a context—the social networking system 104 determines a context associated with a digital communication that includes the new term. For example, in some embodiments, the social networking system 104 applies natural language processing to determine that a digital communication (which includes the new term) concerns finance or health. In such an example, the social networking system 104 creates a second hashkey that includes a context code of "HEA" for health or a context code of "FIN" for finance. When the social networking system 104 cannot determine a context associated with a digital communication, however, the social networking system 104 optionally creates a second hashkey that includes a generic context code of "GEN" for generic context.

In some embodiments, act 222 includes an optional act 224 of normalizing the new term, as shown in FIG. 2B. For example, the social networking system 104 normalizes terms by creating a hashkey that corresponds to two or more terms that have the same meaning (e.g., the terms "Happy Birthday" and "HBD"). An initial term may have the same meaning as a new term when, for example, the new term is a synonym, alternative or misspelled version, acronym, or abbreviation of the initial term. In some embodiments, the social networking system 104 applies natural language processing or references an electronic dictionary, electronic thesaurus, electronic glossary, electronic spell checker, or list of commonly used words to determine that two or more terms have the same meaning.

After determining two or more terms have the same meaning, the social networking system 104 associates the two or more terms. In addition to the social networking system 104 itself determining words have the same meaning, in some embodiments of act 224, the social networking system 104 receives an indication from the client device 108a that the two or more terms have the same meaning and receives an instruction from the client device 108a to associate the two or more terms. Regardless of the process for associating the terms, in some embodiments, the social networking system 104 stores associated terms that have the same meaning within a relational database. Alternatively, in other embodiments, the social networking system 104 stores associated terms that have the same meaning as nodes within a social graph and represents the association between the terms with an edge that connects the nodes.

To normalize two or more terms (in a source language) that have the same meaning, the social networking system 104 creates a reference term that corresponds to the two or more terms. For example, the social networking system 104 may create a reference term of "Happy Birthday" that corresponds to both an initial term of "Happy Birthday" and a new term of "HBD." In this example, the reference term of "Happy Birthday" is a normalization of the new term "HBD." In some embodiments, this normalized reference term may be one component of a hashkey that represents translating "HBD" from a source language to a target language.

Independent of normalizing terms, the social networking system 104 creates and compares hashkeys to facilitate translation. As shown in FIG. 2B, for example, the social networking system 104 performs act 226 of determining whether the first hashkey corresponds to the second hashkey. Act 226 can include determining that hashkeys match and/or normalizing terms so that hashkeys match, as described further below. Although FIGS. 2A-2B illustrate acts involving a first hashkey and a second hashkey, in some embodiments, the social networking system 104 creates and compares any number of hashkeys along with any number of corresponding terms.

When determining whether the first hashkey corresponds to the second hashkey in act 226, the social networking system 104 sometimes compares the first and second hashkeys to determine whether the two hashkeys match. For example, the social networking system 104 may determine that the first hashkey's reference term, source language code, and target language code are the same as the second hashkey's reference term, source language code, and target language code or, alternatively, that the first hashkey and the second hashkey include the same reference term, context code, source language code, and target language code. In other words, in certain embodiments of act 226, the social networking system 104 determines that the first hashkey is identical to the second hashkey.

When performing act 226—and the first and second hashkeys do not match—the social networking system 104 further determines, in some embodiments, whether a reference term of the first hashkey has the same meaning as the reference term (i.e., the new term) corresponding to the second hashkey. To do so, the social networking system 104 may apply any of the above-described techniques (e.g., natural language processing) or refer to any of the above-described resources (e.g., an electronic dictionary).

In the event the social networking system 104 determines that the reference term corresponding to the first hashkey has the same meaning as the reference term corresponding to the second hashkey, the social networking system 104 again normalizes terms, as described above with reference to act 224. When doing so, the social networking system 104 may change the reference term of the second hashkey to match that of the first hashkey (or vice versa) or change the reference terms of both the first and second hashkeys to match.

Additionally, in one or more embodiments, the act 226 can include the social networking system 104 determining to store the second hashkey as a new hashkey. For example, when the social networking system 104 determines that the first and second hashkeys do not match and/or that the reference term of the first hashkey and the reference term of the second hashkey do not have the same meaning, the social networking system 104 sometimes stores the second hashkey within the relational database as a new hashkey. But when the first and second hashkeys match or have reference terms normalized to match, the social networking system 104 sometimes does not store the second hashkey in the relational database, but merely maintains the first hashkey within the relational database and use the first hashkey to locate translations.

Upon determining that the first hashkey corresponds to the second hashkey, the social networking system 104 relies on components associated with the first hashkey to locate a translation. As shown in FIG. 2B, for example, the social networking system 104 performs act 228 of locating the translation of the initial term. When the first hashkey corresponds to the second hashkey and the reference terms match, a translation of the initial term from a source language to a target language is likewise a translation of the new term from the source language to the target language (e.g., a translation of an initial term of "congratulations" from English to "felicitaciones" in Spanish is likewise a translation of a new term of "congrats" from English to "felicitaciones" in Spanish). To locate the translation of the initial term, the social networking system 104 uses components associated with the first hashkey, such as translation identifiers and/or nodes within a social graph of the social networking system 104.

For example, in some embodiments, the social networking system 104 locates the translation of the initial term within the system 104 by using a translation identifier associated with the first hashkey. As noted above, a single translation identifier points to a single translation of the initial term within the social networking system 104 (e.g., by pointing to a node that includes the translation within the social graph of the social networking system 104). Accordingly, if the social networking system 104 associates a single translation identifier with the first hashkey, the system 104 uses that single translation identifier to locate the translation of the initial term within the social networking system 104. Conversely, if the social networking system 104 associates multiple translation identifiers with the first hashkey, the system 104 uses each translation identifier to locate each of the multiple translations within the social networking system 104.

In some embodiments of act 228, the social networking system 104 locates the translation of the initial term within the system 104 by using a node that represents the first hashkey and a node that represents and includes the translation of the initial term. When the social networking system 104 connects the node representing the first hashkey to a node representing the only translation of the initial term, for example, the social networking system 104 uses the edge directly connecting the two nodes to locate the translation. Similarly, when the social networking system 104 connects the node representing the first hashkey to multiple nodes that each represent a translation of the initial term, the system 104 uses the edges directly connecting the node representing the first hashkey to the multiple nodes to locate different translations of the initial term.

In embodiments where the social networking system 104 associates a hashkey with multiple translations, the social networking system 104 selects one translation from among the multiple translations before providing a translation. To select a translation, in certain embodiments, the social networking system 104 generates a score for each translation and compare the scores (e.g., by ranking the translation by score). Optional acts 230 and 232 of FIG. 2B provide two examples of such scores.

As shown in FIG. 2B, the social networking system 104 performs the optional act 230 of generating user appraisal scores. Act 230 includes generating a user appraisal score for each translation of the initial term associated with the first hashkey based on user input. To generate a user appraisal score, for example, the social networking system 104 solicits users to appraise or rate a translation of the initial term from a source language to a target language (e.g., by using a five-star scale, five-point scale, letter grades, or any other suitable rating system). In other embodiments, the social networking system 104 solicits users to rank multiple translations of the initial term from a source language to a target language (e.g., by requesting that the user 112a place in order or assign ranks to multiple translations from most intelligible to least intelligible).

For example, when the users 112a and 112b respectively use client devices 108a and 108b to view a translation of a digital communication comprising the initial term, the social networking system 104 may send a message to the client devices 108a and 108b that requests the users 112a and 112b to rate the translation of the initial term from the source language to the target language (e.g., using a five-star scale). The social networking system 104 may likewise solicit and receive ratings from other users of the social networking system 104 for different translations of a digital communication comprising the initial term. In such embodiments, the social networking system 104 may send a message to different client devices requesting that associated users rate the same translation or send a message to the same client device requesting that an associated user rate different translations. Moreover, when the social networking system 104 sends a request for a rating or appraisal for a translation of a digital communication, the digital communication may include (and the appraisal or rating may correspond to) the initial term by itself, a sentence comprising the initial term, or multiple sentences with at least one sentence comprising the initial term.

After the social networking system 104 receives an appraisal or rating of a translation (or multiple translations) of the initial term, in one or more embodiments, the social networking system 104 generates a user appraisal score. For example, the social networking system 104 generates user appraisal scores based on a mean, median, or mode of ratings provided by users 112 for a first translation and for a second translation of the initial term. Alternatively, or additionally, in some embodiments, the social networking system 104 calculates a standard deviation or generate a linear model, slope, or trend as part of generating a user appraisal score for a particular translation. In embodiments where the first hashkey corresponds to the second hashkey, the social networking system 104 sometimes selects the translation of the initial term having the highest user appraisal score as the translation to provide for the new term. In other embodiments, however, the social networking system 104 selects multiple translations of the initial term as translations to provide for the new term, such as the two translations having the highest user appraisal scores.

In addition or as an alternative to a user appraisal score, in some embodiments, the social networking system 104 performs the optional act 232 of generating confidence scores. For example, act 232 includes generating a confidence score for each translation of the initial term associated with the first hashkey. To do so, the social networking system 104 generates a confidence score for a translation based on a single factor or a combination of factors, such as a factor for a trust level assigned to a source of the translation, a language model, or a translation model. In some embodiments, the social networking system 104 also bases a confidence score on user input, such as the user appraisals or ratings described in act 230 above. As explained below, in embodiments of the social networking system 104 that base a confidence score for a translation on a combination of factors, the social networking system 104 combines a score for each factor into a combined score.

In some embodiments, the act 232 includes the social networking system 104 identifying a source of a translation of a term as a precursor to assigning a trust level. As noted above, the source of a translation may include, but is not limited to, a professional translation service, a translation machine, one of the users 112 of the social networking system 104, or an administrator of the social networking system 104. After identifying the source, in some embodiments, the social networking system 104 assigns a trust level to (or receives an assigned trust level from a user for) the source of a translation.

The term "trust level" refers to a grade or value that represents confidence that a source's translation of a term, sentence, or other communication is accurate. For example, a trust level may apply to a source's translation of terms, sentences, or communications in general from any source language to any target language; a source's translation of specific types of terms (e.g., acronyms or abbreviations used in social networking systems, sporting terms, or scientific nomenclature); or a source's translation from a particular source language to a particular target language, including translations from particular dialects of a source language to particular dialects of a target language (e.g., translations from Parisian French to Pekingese). In some embodiments, the social networking system 104 stores the assigned trust levels for a source in a database, such as a relational database that includes hashkeys and translation identifiers. In other embodiments, the social networking system 104 assigns a weight that reflects a trust level for a source to an edge connecting a node representing a hashkey to a node representing a translation from the source.

As indicated above, in some embodiments, the social networking system 104 uses a language model as a basis for generating a confidence score, such as standard statistical language models known in the art of computational linguistics or machine translation. For example, in some embodiments, the social networking system 104 provides monolingual training data to a translation machine within the social networking system 104. The monolingual training data may be in any language or dialect, such as Swiss German or Egyptian Arabic. Based on the monolingual training data, the translation machine calculates a probability distribution that certain terms are arranged in a particular sequence or that certain terms are used or paired together within communications of the selected language. For example, the translation machine can calculate the probability that certain terms are likely to be paired together within a sentence of the selected language based on the monolingual training data (e.g., a 0.85 probability distribution that "white house" is used in English compared to a 0.15 probability distribution that "white home" is used in English). When calculating the confidence score based on a statistical language model, in certain embodiments, the social networking system 104 generates a probability score that the translation of a term or sentence is consistent with the language model (e.g., a 0.85 probability score that "white" and "house" would be paired together in English compared to other potential translations).

As also indicated above, in some embodiments, the social networking system 104 uses a translation model as a basis for generating a confidence score, such as standard statistical translation models known in the art of computational linguistics or machine translation. For example, in some embodiments, the social networking system 104 provides bilingual training data to the translation machine within the social networking system 104 to train the translation machine to identify translation pairings of terms from a source language to a target language. By processing the training data, the translation machine can identify alignment between terms in repeated translations from the source language to the target language and calculate the probability that certain translations of terms are accurate (e.g., a 0.8 probability that "house" in English is an accurate translation of "casa" in Spanish). When calculating the confidence score based on a statistical translation model, the social networking system 104 sometimes generates a probability score that the translation is consistent with the statistical translation model (e.g., a 0.8 probability score that "house" is the proper translation of "casa").

The social networking system 104 may rely on each of the factors described above individually (or in combination) as a basis for a confidence score. When the social networking system 104 generates a confidence score for a translation based on a single factor, the social networking system 104 sometimes uses the score corresponding to the factor as the confidence score (e.g., by using the trust level as the confidence score itself). Conversely, when the social networking system 104 generates a confidence score for a translation based on two or more factors, the social networking system 104 can combine the scores corresponding to each factor to generate the confidence score (e.g., by summing or multiplying a trust level, probability score for a statistical language model, and a probability score for a statistical translation model to generate a confidence score for a translation).

Both a user appraisal score and a confidence score provide a basis for additional actions by the social networking system 104. For example, in some embodiments, the social networking system 104 can designate a particular translation of a term as a default translation based on a score for a translation. For example, after determining that a score for a first translation of an initial term exceeds a score for a second translation of the initial term (or scores for all other translations of the initial term), the social networking system 104 can designate the first translation of the initial term as a default translation associated with the first hashkey. By designating a translation as a default translation associated with a particular hashkey, the social networking system 104 deactivates a process of scoring multiple translations associated with a hashkey and provides the default translation as the translation for any term associated with the hashkey. In some embodiments, however, the social networking system 104 provides an option to reverse the designation of the default translation.

Additionally, in some embodiments, the social networking system 104 eliminates a translation as a potential translation based on a generated score or scores. For example, after determining a score for a second translation of an initial term, the social networking system 104 can disassociate a second translation identifier (that points to a second translation of the initial term) from a first hashkey within a relational database. In some embodiments that use edges to connect nodes representing hashkeys and translations, the social networking system 104 disconnects an edge connecting a node representing the first hashkey from a node representing a second translation of an initial term.

When eliminating a potential translation, the social networking system 104 may determine to disassociate a translation identifier from a hashkey (or disconnect nodes representing a hashkey and translation) because a user appraisal score or a confidence score for a corresponding translation fails to satisfy a threshold (e.g., the confidence score falls below a threshold that indicates the translation is inaccurate or unintelligible). In some embodiments, the social networking system 104 only disassociates a hashkey from a translation when another translation is available and/or has a confidence score above a particular threshold. In other examples, the social networking system 104 disassociates a hashkey based on comparing two confidence scores of two translations (e.g., determining a threshold difference between confidence scores). Accordingly, by eliminating an association or connection between a translation and a hashkey, the social networking system 104 disables itself from locating the translation based on the hashkey.

After locating (and sometimes selecting) a translation of a term, the social networking system 104 ultimately provides the translation of the term. As shown in FIG. 2B, for example, the social networking system 104 performs the act 234 of providing the translation. For example, the social networking system 104 may provide a single translation of the initial term corresponding to the first hashkey or provide a translation selected from multiple translations corresponding to the first hashkey. In the latter instance, the social networking system 104 optionally provides a translation of the initial term having a higher or highest generated score. For example, the social networking system 104 may provide a first translation of the initial term (instead of a second translation of the initial term) based on determining that the score for the first translation of the initial term exceeds the score for the second translation of the initial term. Alternatively, in some embodiments, the social networking system 104 simultaneously provides multiple translations of the initial term, such as the two highest scoring translations of the initial term.

When performing act 234, the social networking system 104 provides the translation of the initial term in a variety of ways. In some embodiments, the social networking system 104 provides the translation of the initial term for display to the client device 108a within a digital communication, such as within a post, a private message, or an e-mail. For example, the social networking system 104 may provide a translation of the initial term in a target language within a post—with or without a display of the initial term in a source language. Alternatively, the social networking system 104 may provide the translation of the initial term in the target language adjacent to or superimposed over the digital communication in the source language.

Figure 3:
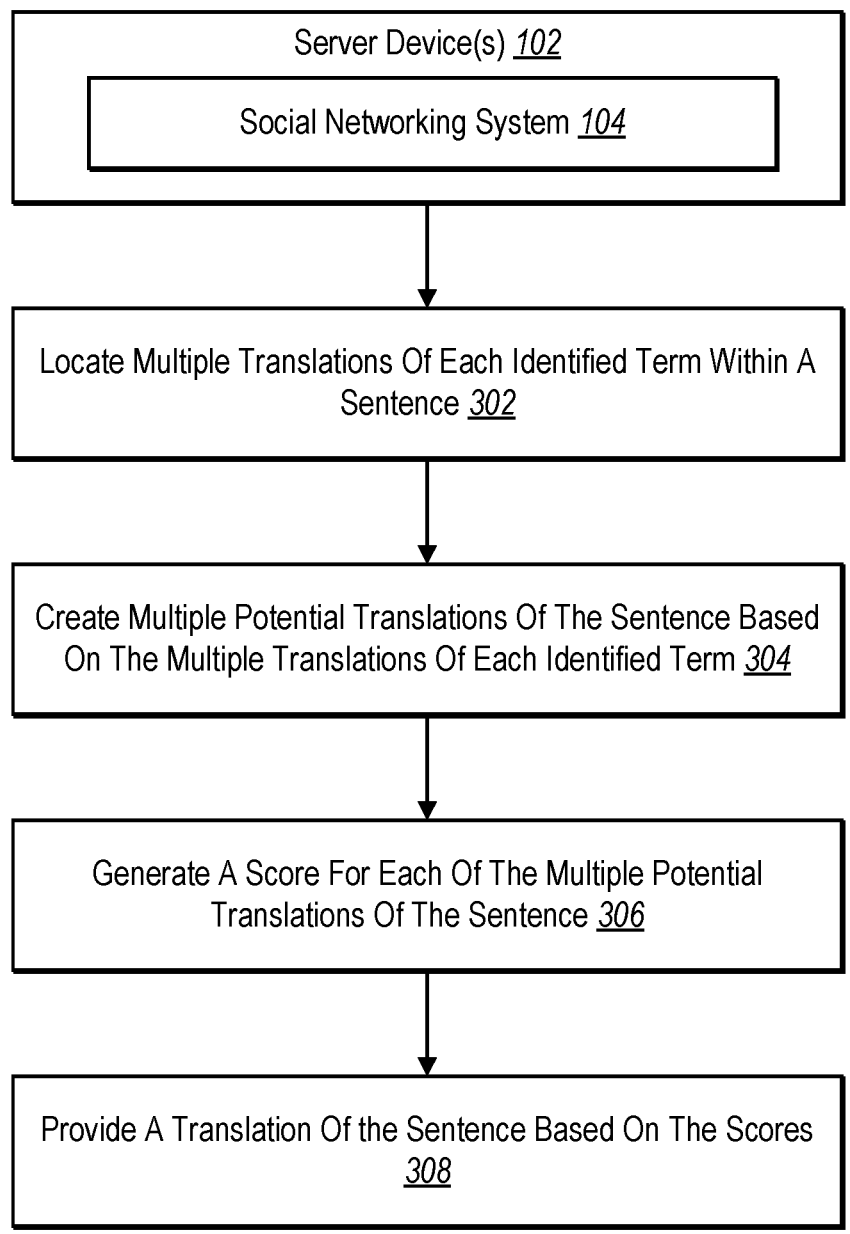
FIG. 3 illustrates a sequence-flow diagram of providing a translation of a sentence in accordance with one or more embodiments of a social networking system.

In addition to providing a translation of a term, in certain embodiments, the social networking system 104 provides a translation of a sentence comprising multiple terms. FIG. 3 illustrates a representation of a sequence of acts 302-308 that the social networking system 104 performs to provide a translation of a sentence by selecting from multiple translations of terms that comprise the sentence. To perform these acts, in some embodiments, the social networking system 104 includes computer-executable instructions that, when executed by a processor of the server device(s) 102, cause the server device(s) 102 of the social networking system 104 to perform acts 302-308 shown in the sequence-flow diagram of FIG. 3.

As noted above, in some embodiments, the social networking system 104 receives multiple translations of a term. When translating a sentence, the multiple translations trigger the social networking system 104 to perform a series of acts to determine which translation of a term to provide as part of the translation of the sentence. As shown in FIG. 3, for example, the social networking system 104 performs the act 302 of locating multiple translations of each identified term within a sentence. When doing so, in some embodiments, the social networking system 104 identifies multiple terms within a sentence in a source language, such as by identifying a new term based on a first segment of the sentence and an additional term based on a second segment of the sentence (e.g., a new term of "my" and an additional term of "house" within an English sentence of "my house").

As when translating a term by itself, the social networking system 104 locates translations of terms within a sentence (from a source language to a target language) by creating a hashkey corresponding to each term and determining whether the newly created hashkeys correspond to previously created hashkeys. In some embodiments of act 302, for example, the social networking system 104 creates a second hashkey that corresponds to the new term and a third hashkey that corresponds to the additional term. As described above—to locate a translation of a term—the social networking system 104 determines that a hashkey of one term corresponds to a hashkey of another term, such as by determining that the second hashkey corresponds to a first hashkey and that the third hashkey corresponds to a fourth hashkey.

In the preceding example, the social networking system 104 previously created the first and fourth hashkeys. Moreover, for simplicity, the first and second hashkeys are based on an identical term (e.g., the initial term and the new term are both the English term "my"), and the third and fourth hashkeys are based on another identical term (e.g., the additional term and some other term are both the English term "house").

When performing act 302, the social networking system 104 locates translations of identified terms in a variety of ways, such as by using translation identifiers or edges connecting nodes within a social graph. For example, in some embodiments, the social networking system 104 locates multiple translations of the new term by using translation identifiers associated with the first hashkey and also locate multiple translations of the additional term by using translation identifiers associated with the fourth hashkey. Each of the translations identifiers of the first hashkey point to a unique translation of the new term (which, again, is identical to the initial term) within the social networking system 104 (e.g., a first translation identifier points to the Spanish translation "mi" and a second translation identifier points to the Spanish translation "mis"). Similarly, each of the translation identifiers of the fourth hashkey point to a unique translation of the additional term (which, again, is identical to the reference term corresponding to the fourth hashkey) within the social networking system 104 (e.g., a third translation identifier points to the Spanish translation "casa" and a fourth translation identifier points to the Spanish translation "hogar").

As another example, in some embodiments, the social networking system 104 locates multiple translations of the new term and the additional term by using nodes that represent the first hashkey and fourth hashkey as well as nodes that represent translations of the new term and additional term. In such embodiments, the social networking system 104 uses an edge to connect the node representing the first hashkey to each node representing one of the multiple translations of the new term (e.g., two edges respectively connecting the node representing the first hashkey to nodes representing the Spanish translations "mi" and "mis"). Conversely, the social networking system 104 uses an edge to connect the node representing the fourth hashkey to each node representing one of the multiple translations of the additional term (e.g., two edges respectively connecting the node representing the first hashkey to nodes representing the Spanish translations "casa" and "hogar"). Whether using translation identifiers or edges, the social networking system 104 locates translations of a term (or multiple terms) by locating translations corresponding to hashkeys that in turn correspond to the terms to be translated.

After locating multiple translations of each identified term, in certain embodiments, the social networking system 104 performs the act 304 of creating multiple potential translations of the sentence based on the multiple translations of each identified term. For example, in some embodiments, the social networking system 104 performs act 304 by creating possible combinations of the multiple translations of the identified terms (from a source language to a target language). Continuing the example from above, in such embodiments, the social networking system 104 creates four potential Spanish translations of the English sentence "my house"—that is, the Spanish translations "mi casa," "mis casa," "mi hogar," and "mis hogar."

In other embodiments, the social networking system 104 creates a limited number of combinations of the multiple translations of the identified terms based on a language model or a translation model. Again continuing the example from above, in such embodiments, the social networking system 104 creates potential Spanish translations of the English sentence "my house" that are consistent with one or more grammar rules of a Spanish language model. For example, the social networking system 104 creates two potential Spanish translations of the English sentence "my house" consistent with Spanish grammar rules for singular and plural nouns. Because "casa" and "hogar" are singular nouns in Spanish, this particular embodiment of the social networking system 104 creates the Spanish translations "mi casa" and "mi hogar." In any event, upon performing act 304, the social networking system 104 has created multiple translations of the sentence from which to select and provide a translation.

In some instances, the social networking system 104 selects from among multiple translations of the sentence similar to how the social networking system 104 selects from among multiple translations of a term. As shown in FIG. 3, for example, the social networking system 104 performs the act 306 of generating a score for each of the multiple potential translations of the sentence. To do so, in certain embodiments, the social networking system 104 generates a user appraisal score or a confidence score (as described above) for each translation of the sentence with some modifications to adjust the scores for a translation of a sentence.

For example, in some embodiments, the social networking system 104 generates the score based on at least one factor corresponding to the translation of the sentence (instead of corresponding to a translation of an individual term), such as a combined score based on at least two of a rating, rank, trust level, language model probability score, or translation model probability score for the translation of the sentence. In other embodiments, the social networking system 104 generates the score based on at least one factor corresponding to translations of each identified term within the sentence, such as a combined score based on at least one rating, rank, trust level, language model probability score, or translation model probability score for translations of identified terms that comprise the translation of the sentence. In yet other embodiments, the social networking system 104 generates the score based on a combination of both factors corresponding to the translation of the sentence and factors corresponding to the translations of identified terms that comprise the translation of the sentence.

The scores for the multiple translations of the sentence provide information that enable the social networking system 104 to select and provide a translation of the sentence. As shown in FIG. 3, the social networking system 104 performs the act 308 of providing a translation of the sentence based on the scores. For example, in some embodiments, the social networking system 104 provide a first translation of the sentence (instead of a second translation of the sentence) based on determining that the score for the first translation of the sentence exceeds the score for the second translation of the sentence. Alternatively, in some embodiments, the social networking system 104 simultaneously provides multiple translations of the sentence. Similar to providing a translation of a term, in certain embodiments, the social networking system 104 provide the translation of the sentence in any of the ways described above (e.g., for display to the client device 108a within, adjacent to, or superimposed over a digital communication with or without a display of the sentence in a source language).

Figure 4:
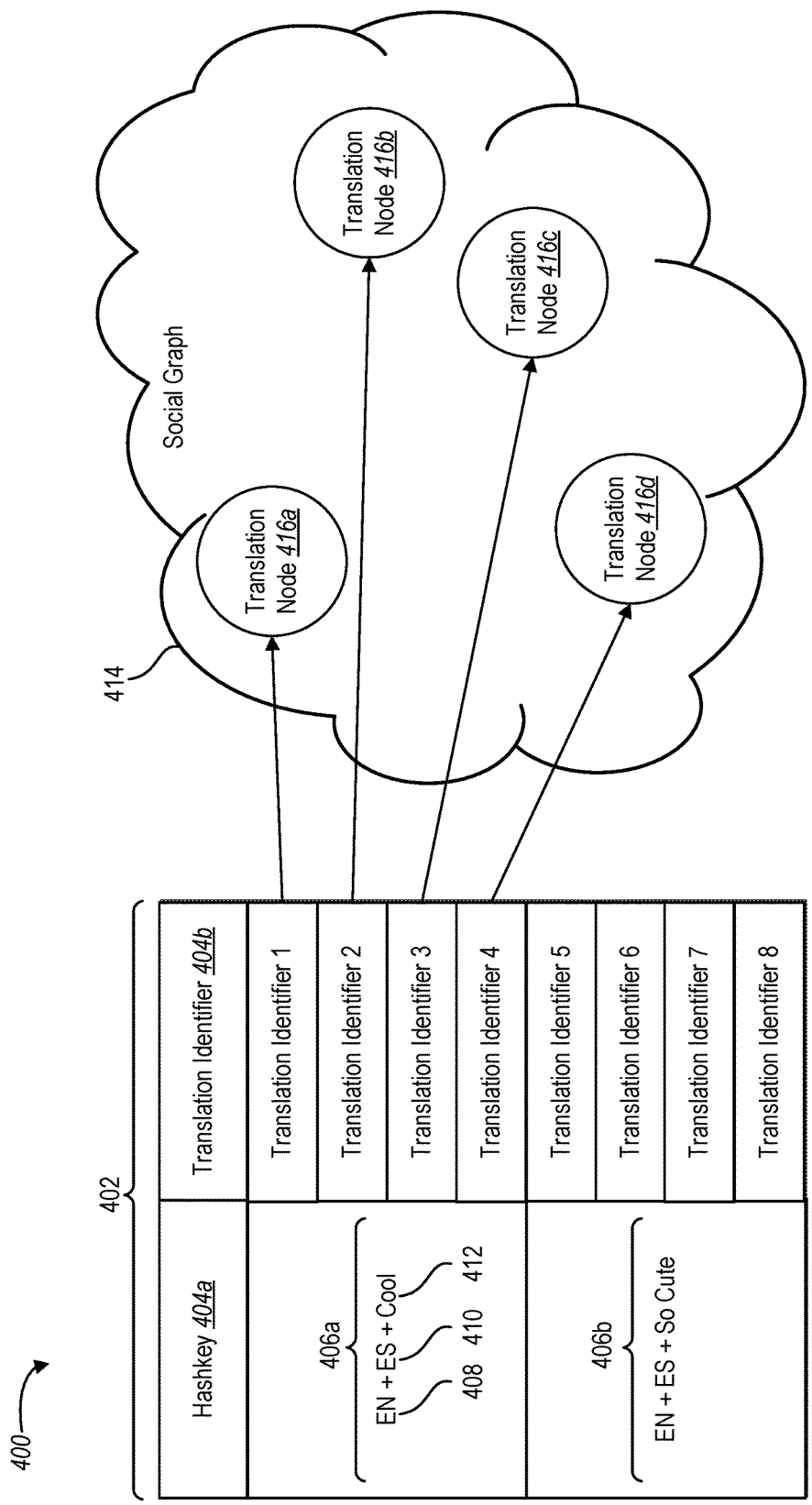
FIG. 4 illustrates a relational database for hashkeys in accordance with one or more embodiments of a social networking system.

Turning now to FIG. 4, as noted above and in some embodiments, the social networking system 104 uses a social graph of the social networking system 104 to locate and improve translations. FIG. 4 illustrates a concept diagram 400 of an embodiment of the social networking system 104 that uses a social graph 414 of the social networking system 104 to locate translations through a relational database 402 for hashkeys 406a and 406b and associated translation identifiers. As shown in FIG. 4, the relational database includes a column for hashkeys 404a and a column for translation identifiers 404b.

In this particular embodiment, the social networking system 104 associates the hashkey 406a with translation identifiers 1-4 by aligning a row in the relational database for the hashkey 406a with rows for each of the translation identifiers 1-4. The social networking system 104 aligns the hashkey 406a with translation identifiers 5-8 in the same manner. Of course, FIG. 4 illustrates merely one way in which the social networking system 104 associates a hashkey with translation identifiers. In other embodiments, the social networking system 104 associates a hashkey with translation identifiers by, for example, aligning a row for the hashkey with multiple columns for translation identifiers that each include a translation identifier in a corresponding row—to the extent a hashkey has one or more associated translation identifiers.

FIG. 4 likewise illustrates an embodiment of a hashkey within a relational database. As shown in FIG. 4, the hashkey 406a comprises a source language code 408 (i.e., a code of "EN" that corresponds to a source language of English), a target language code 410 (i.e., a code of "ES" that corresponds to a target language of Spanish), and a reference term 412 (i.e., a reference term of "cool" that corresponds to versions or abbreviations of "cool," such as "kewl," "kool," and "cool").

As further shown in FIG. 4, each of the translation identifiers 1-4 point to a node that represents and includes a translation within the social graph 414. Specifically, translation nodes 416a-416d each represent and include a translation of the reference term 412 ("cool") from a source language of English to a target language of Spanish. For example, the translation node 416a includes the Spanish translation "guay," the translation node 416b includes the Spanish translation "genial," the translation node 416c includes the Spanish translation "frio," and the translation node 416d includes the Spanish translation "fresco." In this particular embodiment, the social networking system 104 ranks each translation based on a user appraisal score or confidence score for the translation. To reflect the ranking, the social networking system 104 orders the translation identifiers 1-4 corresponding to the rank for each translation node from highest to lowest score, with translation identifier 1 corresponding to the translation having the highest score and translation identifier 4 corresponding to the translation having the lowest score among the four translations.

Figure 5:
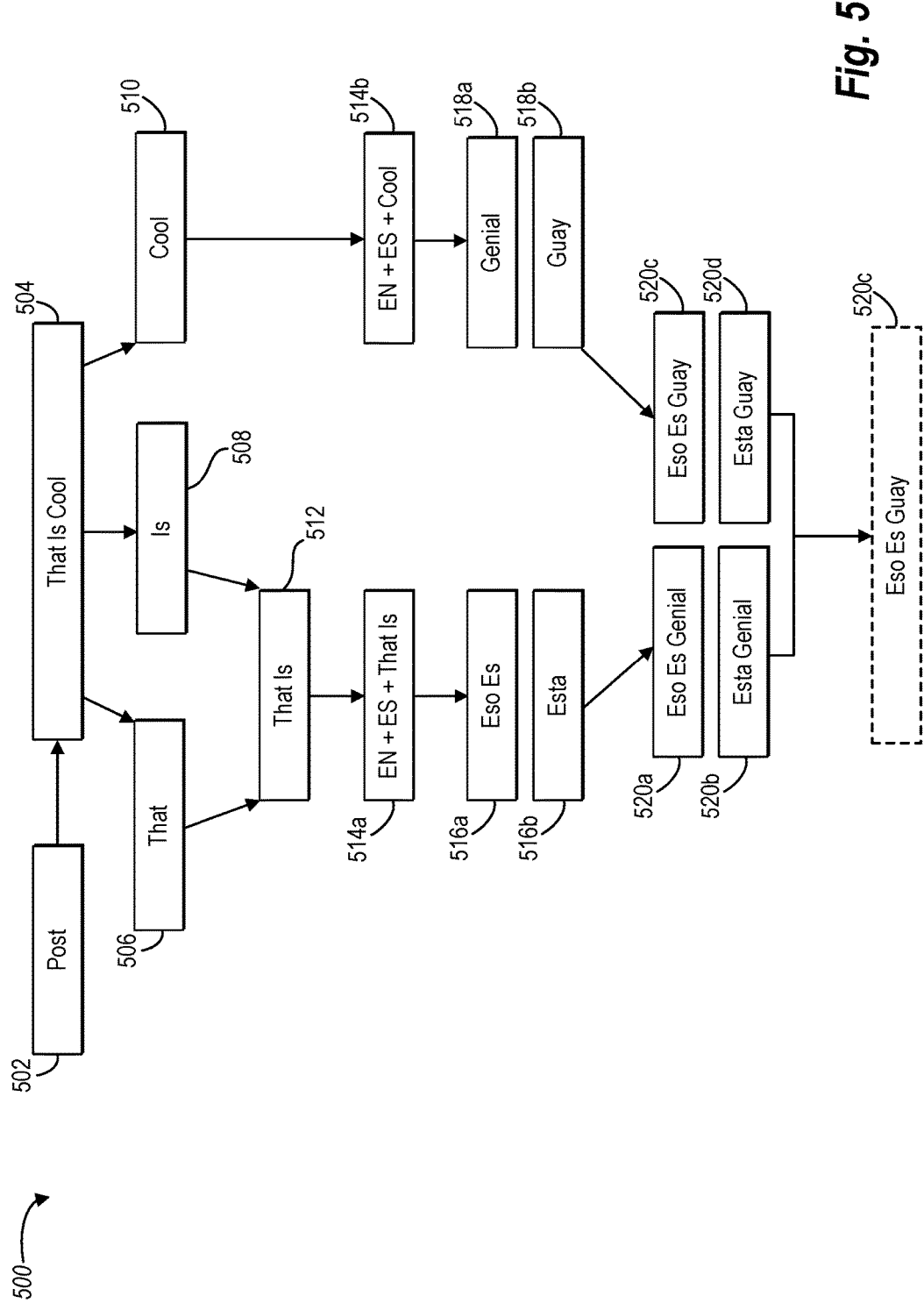
FIG. 5 illustrates a conceptual diagram showing a process of providing a translation of a digital communication in accordance with one or more embodiments of a social networking system.

Turning now to FIG. 5, this figure illustrates a conceptual diagram 500 showing a process of providing a translation of a digital communication. Specifically, FIG. 5 provides an example of the social networking system 104 creating and using hashkeys to provide a translation of a sentence within a digital communication. In describing FIG. 5, this disclosure will refer to digital objects 502-520 upon which the social networking system 104 performs certain actions to provide a translation. The actions described below represent merely one embodiment of the social networking system translating a sentence consistent with the acts 302-308 set forth in FIG. 3.

As indicated by FIG. 5, the social networking system 104 receives a digital communication 502 from one of the client devices 108. In the example shown in FIG. 5, the social networking system 104 receives a post from the client device 108a on a timeline of the user 112a. Upon receiving the digital communication 502, the social networking system 104 identifies a sentence 504 ("That is cool") in a source language of English within the digital communication 502.

At some point after receiving the digital communication 502, the social networking system 104 receives a request from the client device 108b to access the digital communication 502. Either before or after receiving this request, the social networking system 104 detects that the user 112b associated with the client device 108b predominantly communicates in Spanish within the social networking system 104 (e.g., by detecting that a majority of comments or posts associated with an account for the user 112b are in Spanish). Based on detecting that the user 112b predominantly communicates in Spanish, the social networking system 104 determines to translate the sentence 504 from the source language of English to a target language of Spanish.

Upon determining to translate the sentence 504, the social networking system 104 identifies a first segment 506, a second segment 508, and a third segment 510 consistent with one of the embodiments described above. In this particular example, each segment (506, 508, and 510) includes a term. The social networking system 104 identifies the English term of "that" within the first segment 506, the English term of "is" within the second segment 508, and the English term of "cool" within the third segment 510. Because the third segment 510 includes the lone English term "cool," this disclosure will hereinafter refer to the third segment 510 as the term 510 "cool."

Based on an English-to-Spanish translation model—and consistent with the description above—the social networking system 104 combines the first segment 506 and the second segment 508 to form the term 512 "that is." In this particular example, the social networking system 104 combines the first segment 506 and the second segment 508 because the social networking system 104 has identified specific translations of the term 512 "that is"—based on the English-to-Spanish translation model—that correspond to more accurate Spanish translations than Spanish translations of the individual terms of "that" and "is," separately.

Consistent with the disclosure above, the social networking system 104 creates a hashkey 514a based on the source language of English, the target language of Spanish, and the term 512 "that is." Similarly, the social networking system 104 creates a hashkey 514b based on the source language of English, the target language of Spanish, and the term 510 "cool." Each of the hashkeys 514a and 514b comprise a source language code "EN" for English, a target language code "ES" for Spanish, and a reference term—with the hashkey 514a including a reference term of "that is" and the hashkey 514b including a reference term of "cool."

By creating the hashkeys 514a and 514b, the social networking system 104 creates a reference to locate previously created hashkeys and corresponding translations. For example, the social networking system 104 determines whether the hashkeys 514a and 514b correspond with any previously created hashkeys within a relational database, consistent with the disclosure above. In this particular example, the social networking system 104 determines that the hashkey 514a matches a first previously created hashkey (EN+ES+that is) and that the hashkey 514b matches a second previously created hashkey (EN+ES+cool).

As explained above, by finding matching hashkeys, the social networking system 104 locates translations of reference terms that correspond to the previously created hashkeys. Consistent with that disclosure, the social networking system 104 uses the first previously created hashkey to locate a Spanish term translation 516a and another Spanish term translation 516b (both of which are translations of the reference term "that is"). The social networking system 104 likewise uses the second previously created hashkey to locate a Spanish term translation 518a and another Spanish term translation 518b (both translations of the reference term "cool").

To do so, the social networking system 104 identifies translation identifiers associated with the first and second previously created hashkeys. A couple of translation identifiers associated with the first previously created hashkey respectively point to a node within a social graph representing the Spanish term translation 516a and a node within the social graph representing the Spanish term translation 516b. Similarly, a couple of translation identifiers associated with the second previously created hashkey respectively point to a node within the social graph representing the Spanish term translation 518a and a node within the social graph representing the Spanish term translation 518b. Accordingly, the associated translation identifiers point to and enable the social networking system 104 to locate Spanish term translations 516a, 516b, 518a, and 518b.

FIG. 5 further illustrates an example of the social networking system 104 creating multiple potential translations of a simple sentence. Based on the Spanish term translations 516a, 516b, 518a, and 518b, the social networking system 104 creates multiple potential translations of the sentence 504. As shown in FIG. 5, the social networking system 104 creates a Spanish sentence translation 520a ("Eso es guay"), a Spanish sentence translation 520b ("Esta guay"), a Spanish sentence translation 520c ("Eso es genial"), and a Spanish sentence translation 520d ("Esta genial"). To create each Spanish sentence translation, the social networking system 104 combines one of the Spanish term translations 516a and 516b with one of the Spanish term translations 518a and 518b. In this particular embodiment, the social networking system 104 creates ever possible combination of the Spanish term translations 516a and 516b with the Spanish term translations 518a and 518b.

With four Spanish sentence translations from which to select, the social networking system 104 generates a confidence score for each of the Spanish sentence translations 520a, 520b, 520c, and 520d. Consistent with the disclosure above, the social networking system 104 generates a combined confidence score for each of the Spanish sentence translations 520a, 520b, 520c, and 520d based on two factors—a Spanish language model probability score and an English-to-Spanish translation model probability score. Based on determining that the combined confidence score for the Spanish sentence translation 520c exceeds the combined confidence score for each of the Spanish sentence translations 520a, 520b, and 520d, the social networking system provides the Spanish sentence translation 520c ("Eso es guay") as a translation of the sentence 504 ("That is cool") to the client device 108b for display (e.g., within a view of the post and without the sentence 504 shown in English).

Figure 6:
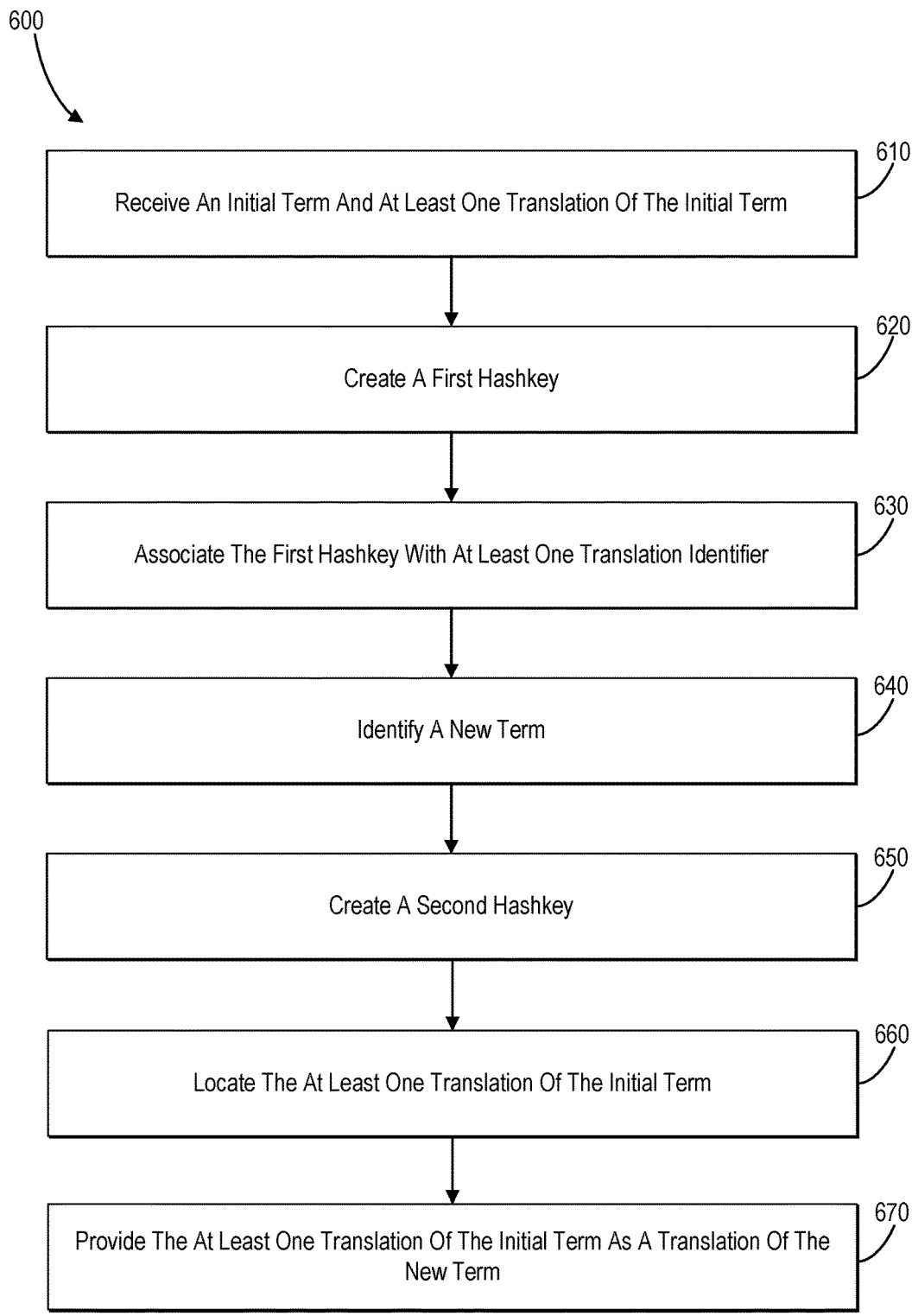
FIG. 6 illustrates a flowchart of a series of acts in a method of creating hashkeys for translating terms within a digital communication in accordance with one or more embodiments of a social networking system.

Turning now to FIG. 6, this figure illustrates a flowchart of a series of acts in a method 600 of creating hashkeys for translating terms within a digital communication in accordance with one or more embodiments of the social networking system 104. While FIG. 6 illustrates acts according to one embodiment, alternative embodiments may omit, add to, reorder, and/or modify any of the acts shown in FIG. 6. Further, the social networking system 104, the client device 108a, or a combination of both, may perform one or more of the acts of the method 600.

As shown in FIG. 6, the method 600 includes an act 610 of receiving an initial term and at least one translation of the initial term. In particular, the act 610 can include receiving, by a digital communication system, an initial term in a source language and at least one translation of the initial term in a target language. In one or more embodiments, the at least one translation of the initial term comprises a first translation of the initial term and a second translation of the initial term. Additionally, in some embodiments, the initial term comprises a word or a phrase.

As shown in FIG. 6, the method 600 also includes an act 620 of creating a first hashkey. In particular, the act 620 can include creating a first hashkey based on the initial term, the source language, and the target language. In one or more embodiments, creating the first hashkey based on the initial term, the source language, and the target comprises creating the first hashkey comprising a reference term corresponding to the initial term, a source language code that corresponds to the source language, and a target language code that corresponds to the target language.

As shown in FIG. 6, the method 600 also includes an act 630 of associating the first hashkey with at least one translation identifier within a relational database. In particular, the act 630 can include associating the first hashkey with at least one translation identifier within a relational database, wherein the at least one translation identifier points to the at least one translation of the initial term. In one or more embodiments, the at least one translation identifier within the relational database comprises a first translation identifier that points to the first translation of the initial term and a second translation identifier that points to the second translation of the initial term.

As shown in FIG. 6, the method 600 also includes an act 640 of identifying a new term. In particular, the act 640 can include, based on determining to translate a digital communication from the source language to the target language, identifying, within the digital communication, a new term in the source language. In one or more embodiments, the initial term differs from the new term.

As shown in FIG. 6, the method 600 also includes an act 650 of creating a second hashkey. In particular, the act 650 can include creating a second hashkey based on the new term, the source language, and the target language. In one or more embodiments, the first hashkey and the second hashkey each comprise a reference term that corresponds to the initial term and the new term. Additionally, in one or more embodiments, creating the second hashkey based on the new term, the source language, and the target language comprises creating the second hashkey comprising a reference term corresponding to the new term, the source language code, and the target language code.

As shown in FIG. 6, the method 600 also includes an act 660 of locating the at least one translation of the initial term. In particular, the act 660 can include, based on determining that the first hashkey corresponds to the second hashkey, locating the at least one translation of the initial term using the at least one translation identifier associated with the first hashkey.

As shown in FIG. 6, the method 600 also includes an act 670 of providing the at least one translation of the initial term as a translation of the new term. In particular, the act 670 can include, based on determining that the first hashkey corresponds to the second hashkey, providing the at least one translation of the initial term as a translation of the new term.

In some embodiments, the method 600 include generating a score for translations. For example, in one or more embodiments, the method 600 further includes generating a score for the first translation of the initial term and a score for the second translation of the initial term; determining that the score for the first translation of the initial term exceeds the score for the second translation of the initial term; wherein locating the at least one translation of the initial term comprises locating the first translation of the initial term using the first translation identifier based on determining the score for the first translation exceeds the score for the second translation; and providing the at least one translation of the initial term as a translation of the new term comprises providing the first translation of the initial term as the translation of the new term.

Additionally, in one or more embodiments, generating the scores for the first translation of the initial term and for the second translation of the initial term comprises generating user appraisal scores for the first translation of the initial term and for the second translation of the initial term based on input from a plurality of users of the digital communication system.

Moreover, in one or more embodiments, the method 600 further includes identifying a source of the first translation of the initial term and a source of the second translation of the initial term, wherein each source comprises a professional translation service, a translation machine, or a user of the digital communication system; and assigning a trust level to the source of the first translation of the initial term and a trust level to the source of the second translation of the initial term. In some such embodiments, generating the scores for the first translation of the initial term and for the second translation of the initial term comprises generating confidence scores for the first translation of the initial term and for the second translation of the initial term based on at least one of the assigned trust levels, a language model, or a translation model.

In some embodiments, the method 600 that generate scores include additional actions based on the scores. For example, in one or more embodiments, the method 600 further includes, based on determining that the score for the first translation exceeds the score for the second translation, designating the first translation of the initial term as a default translation associated with the first hashkey within the relational database. Additionally, in one or more embodiments, the method 600 further includes, based on determining the score for the second translation, disassociating the second translation identifier that points to the second translation of the initial term from the first hashkey within the relational database.

In some embodiments, the method 600 further include identifying or translating a sentence. For example, in one or more embodiments, the method 600 includes identifying a sentence in the source language within the digital communication; and identifying a first segment and a second segment within the sentence, wherein the first segment and the second segment each comprise a word or a phrase and the new term comprises the word or the phrase of the first segment. In some such embodiments, the method 600 further includes identifying an additional term based on the second segment; creating a third hashkey based on the additional term, the source language, and the target language; and locating a translation of the additional term within the digital communication system using the third hashkey. Alternatively, in one or more embodiments, the method 600 includes identifying a plurality of segments of a sentence in the source language within the digital communication; and combining two or more segments of the plurality of segments, wherein the new term comprises a combination of the two or more segments.

Additionally, in one or more embodiments, the method 600 includes combining the translation of the new term and the translation of the additional term to generate a translation of the sentence. Relatedly, in one or more embodiments, the method 600 further includes generating a plurality of translations of the sentence using the translation of the additional term and multiple potential translations corresponding to the first hashkey. In some such embodiments, the method 600 further includes generating a confidence score for each of the plurality of translations of the sentence based on a trust level associated with a source of each potential translation from the multiple potential translations corresponding to the first hashkey; and based on determining the confidence scores, providing a translation of the sentence having the highest confidence score from among the plurality of translations of the sentence.

Finally, in one or more embodiments, the method 600 further includes creating a node, within a social graph of the digital communication system, that represents and includes the at least one translation of the initial term, wherein the translation identifier points to the node within the social graph.

Figure 7:
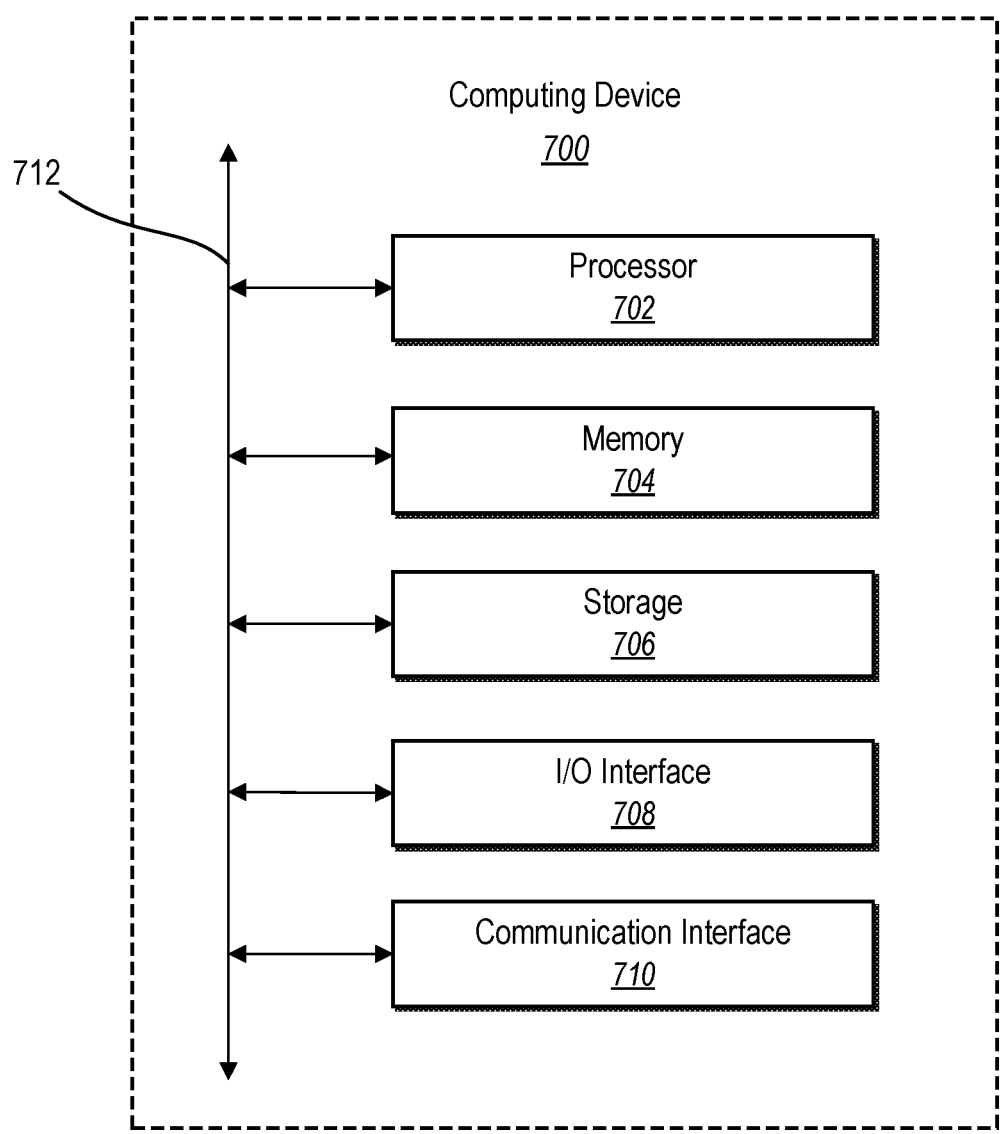
FIG. 7 illustrates a block diagram of an example computing device in accordance with one or more embodiments of a social networking system.

FIG. 7 illustrates a block diagram of exemplary computing device 700 that may be configured to perform one or more of the processes described above. One will appreciate that one or more computing devices such as the computing device 700 may implement the social networking system 104. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers ("TLBs"). Instructions in the instruction caches may be copies of instructions in the memory 704 or the storage device 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive ("HDD"), flash memory, an optical disc, a magneto-optical disc, magnetic tape, or a Universal Serial Bus ("USB") drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touchscreen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 710 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 710 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 8:
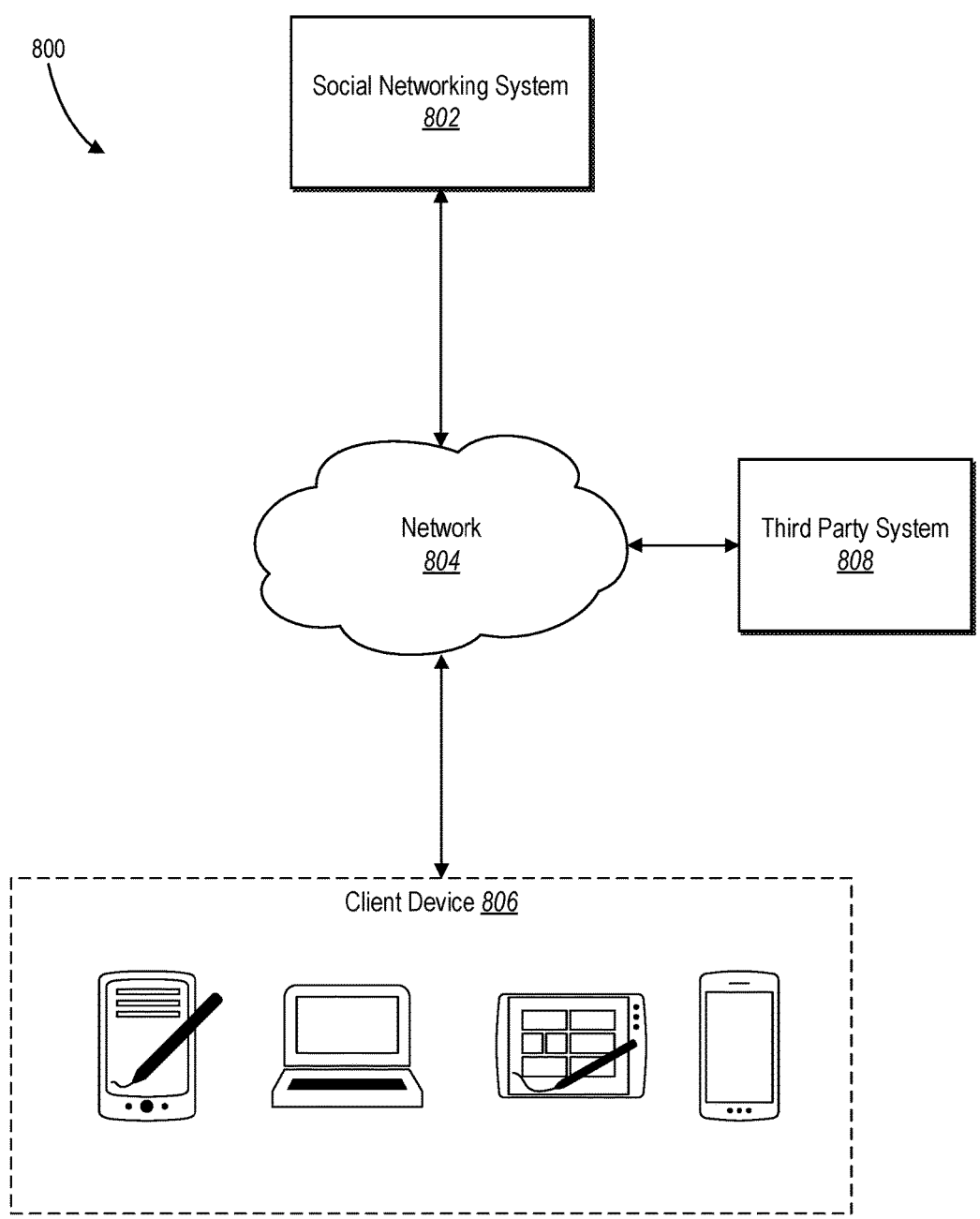
FIG. 8 illustrates a network environment of a social networking system according to one or more embodiments of the social networking system.

FIG. 8 illustrates an example network environment 800 of a social-networking system. Network environment 800 includes a client device 806, a social-networking system 802, and a third-party system 808 connected to each other by a network 804. Although FIG. 8 illustrates a particular arrangement of client device 806, social-networking system 802, third-party system 808, and network 804, this disclosure contemplates any suitable arrangement of client device 806, social-networking system 802, third-party system 808, and network 804. As an example and not by way of limitation, two or more of client device 806, social-networking system 802, and third-party system 808 may be connected to each other directly, bypassing network 804. As another example, two or more of client device 806, social-networking system 802, and third-party system 808 may be physically or logically co-located with each other in whole or in part. Moreover, although FIG. 8 illustrates a particular number of client devices 806, social-networking systems 802, third-party systems 808, and networks 804, this disclosure contemplates any suitable number of client devices 806, social-networking systems 802, third-party systems 808, and networks 804. As an example and not by way of limitation, network environment 800 may include multiple client device 806, social-networking systems 802, third-party systems 808, and networks 804.

This disclosure contemplates any suitable network 804. As an example and not by way of limitation, one or more portions of network 804 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 804 may include one or more networks 804.

Links may connect client device 806, social-networking system 802, and third-party system 808 to communication network 804 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client device 806 may be an electronic device including hardware, software, or embedded logic components or a combination of two or more such components and capable of carrying out the appropriate functionalities implemented or supported by client device 806. As an example and not by way of limitation, a client device 806 may include any of the computing devices discussed above in relation to FIG. 7. A client device 806 may enable a network user at client device 806 to access network 804. A client device 806 may enable its user to communicate with other users at other client devices 806.

In particular embodiments, client device 806 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 806 may enter a Uniform Resource Locator ("URL") or other address directing the web browser to a particular server (such as server, or a server associated with a third-party system 808), and the web browser may generate a Hyper Text Transfer Protocol ("HTTP") request and communicate the HTTP request to server. The server may accept the HTTP request and communicate to client device 806 one or more Hyper Text Markup Language ("HTML") files responsive to the HTTP request. Client device 806 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 802 may be a network-addressable computing system that can host an online social network. Social-networking system 802 may generate, store, receive, and send social-networking data, such as, for example, user-profile data, concept-profile data, social-graph information, or other suitable data related to the online social network. Social-networking system 802 may be accessed by the other components of network environment 800 either directly or via network 804. In particular embodiments, social-networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 806, a social-networking system 802, or a third-party system 808 to manage, retrieve, modify, add, or delete, the information stored in data store.

In particular embodiments, social-networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 802 may provide users of the online social network the ability to communicate and interact with other users. In particular embodiments, users may join the online social network via social-networking system 802 and then add connections (e.g., relationships) to a number of other users of social-networking system 802 whom they want to be connected to. Herein, the term "friend" may refer to any other user of social-networking system 802 with whom a user has formed a connection, association, or relationship via social-networking system 802.

In particular embodiments, social-networking system 802 may provide users with the ability to take actions on various types of items or objects, supported by social-networking system 802. As an example and not by way of limitation, the items and objects may include groups or social networks to which users of social-networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 802 or by an external system of third-party system 808, which is separate from social-networking system 802 and coupled to social-networking system 802 via a network 804.

In particular embodiments, social-networking system 802 may be capable of linking a variety of entities. As an example and not by way of limitation, social-networking system 802 may enable users to interact with each other as well as receive content from third-party systems 808 or other entities, or to allow users to interact with these entities through an application programming interfaces ("API") or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social-networking system 802. In particular embodiments, however, social-networking system 802 and third-party systems 808 may operate in conjunction with each other to provide social-networking services to users of social-networking system 802 or third-party systems 808. In this sense, social-networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client device 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 802 also includes user-generated content objects, which may enhance a user's interactions with social-networking system 802. User-generated content may include anything a user can add, upload, send, or "post" to social-networking system 802. As an example and not by way of limitation, a user communicates posts to social-networking system 802 from a client device 806. Posts may include data such as status updates or other textual data, location information, photos, videos, links, music or other similar data or media. Content may also be added to social-networking system 802 by a third-party through a "communication channel," such as a newsfeed or stream.

In particular embodiments, social-networking system 802 may include a variety of servers, sub-systems, programs, modules, logs, and data stores. In particular embodiments, social-networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 802 may also include suitable components such as network interfaces, security mechanisms, load balancers, failover servers, management-and-network-operations consoles, other suitable components, or any suitable combination thereof. In particular embodiments, social-networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 802 to one or more client devices 806 or one or more third-party system 808 via network 804. The web server may include a mail server or other messaging functionality for receiving and routing messages between social-networking system 802 and one or more client devices 806. An API-request server may allow a third-party system 808 to access information from social-networking system 802 by calling one or more APIs. An action logger may be used to receive communications from a web server about a user's actions on or off social-networking system 802. In conjunction with the action log, a third-party-content-object log may be maintained of user exposures to third-party-content objects. A notification controller may provide information regarding content objects to a client device 806. Information may be pushed to a client device 806 as notifications, or information may be pulled from client device 806 responsive to a request received from client device 806. Authorization servers may be used to enforce one or more privacy settings of the users of social-networking system 802. A privacy setting of a user determines how particular information associated with a user can be shared. The authorization server may allow users to opt in to or opt out of having their actions logged by social-networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client devices 806 associated with users. Advertisement-pricing modules may combine social information, the current time, location information, or other suitable information to provide relevant advertisements, in the form of notifications, to a user.

Figure 9:
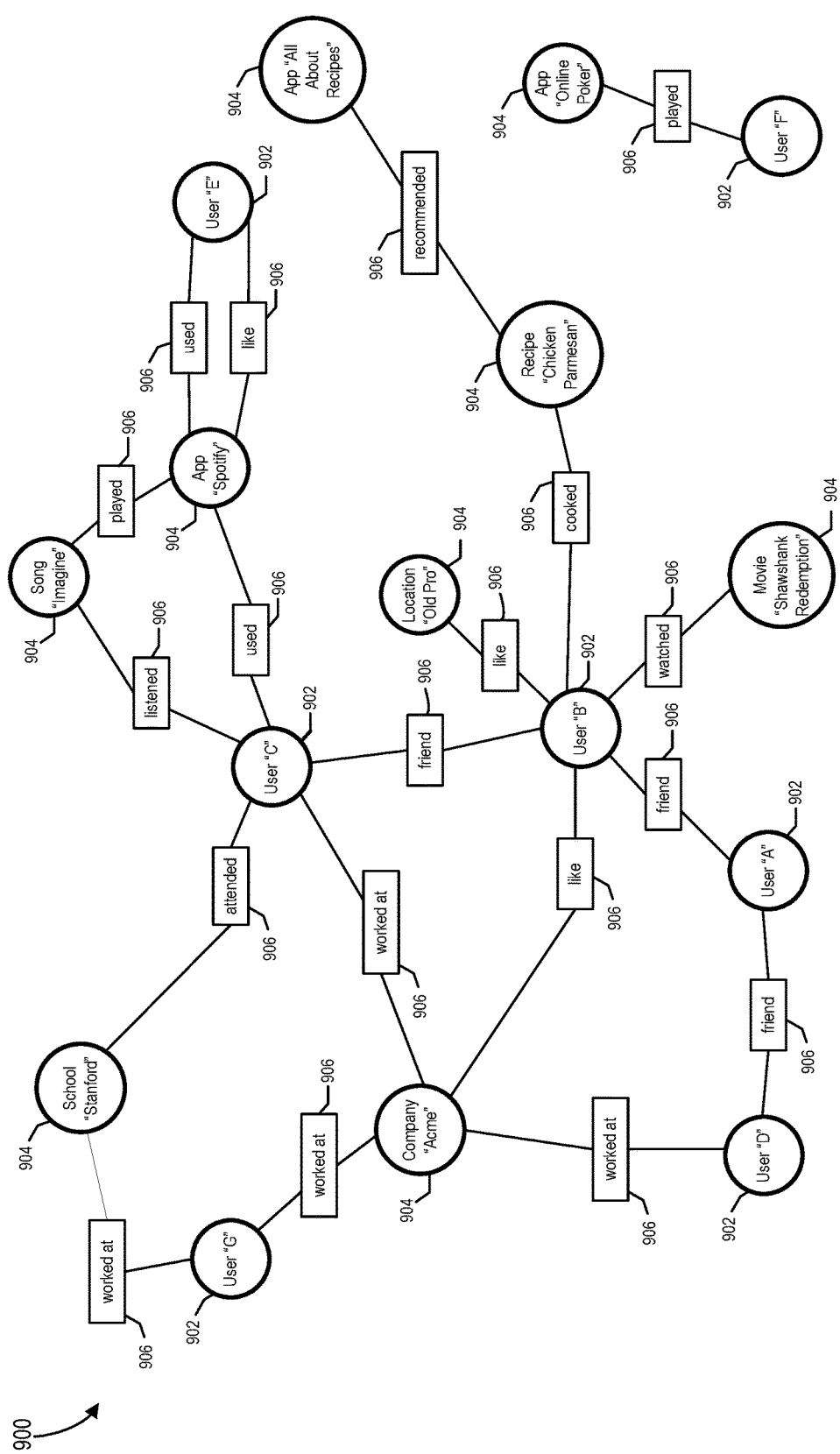
FIG. 9 illustrates an example social graph for a social networking system in accordance with one or more embodiments of the social networking system.

FIG. 9 illustrates example social graph 900. In particular embodiments, social-networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 802, client device 806, or third-party system 808 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 802. As an example and not by way of limitation, a user may be an individual (human user), an entity (e.g., an enterprise, business, or third-party application), or a group (e.g., of individuals or entities) that interacts or communicates with or over social-networking system 802. In particular embodiments, when a user registers for an account with social-networking system 802, social-networking system 802 may create a user node 902 corresponding to the user, and store the user node 902 in one or more data stores. Users and user nodes 902 described herein may, where appropriate, refer to registered users and user nodes 902 associated with registered users. In addition, or as an alternative, users and user nodes 902 described herein may, where appropriate, refer to users that have not registered with social-networking system 802. In particular embodiments, a user node 902 may be associated with information provided by a user or information gathered by various systems, including social-networking system 802. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social-networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social-networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 802. Profile pages may also be hosted on third-party websites associated with a third-party server 808. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 806 to send to social-networking system 802 a message indicating the user's action. In response to the message, social-networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 802 may send a "friend request" to the second user. If the second user confirms the "friend request," social-networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 802 may create an edge 906 between a user node 902 and a concept node 904 in social graph 900. As an example and not by way of limitation, a user viewing a concept-profile page (such as, for example, by using a web browser or a special-purpose application hosted by the user's client device 806) may indicate that he or she likes the concept represented by the concept node 904 by clicking or selecting a "Like" icon, which may cause the user's client device 806 to send to social-networking system 802 a message indicating the user's liking of the concept associated with the concept-profile page. In response to the message, social-networking system 802 may create an edge 906 between user node 902 associated with the user and concept node 904, as illustrated by "like" edge 906 between the user and concept node 904. In particular embodiments, social-networking system 802 may store an edge 906 in one or more data stores. In particular embodiments, an edge 906 may be automatically formed by social-networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social-networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 802) or RSVP (e.g., through social-networking system 802) to an event associated with the advertisement. In addition or as an alternative, an advertisement may include social-networking-system context directed to the user. As an example and not by way of limitation, an advertisement may display information about a friend of the user within social-networking system 802 who has taken an action associated with the subject matter of the advertisement.

In particular embodiments, social-networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 802 may calculate a coefficient based on a user's actions. Social-networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social-networking system 802 may analyze a user's actions to determine whether one or more of the actions indicate an affinity for subject matter, content, other users, and so forth. As an example and not by way of limitation, if a user may make frequently posts content related to "coffee" or variants thereof, social-networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 802 may calculate a coefficient based on the type of relationship between particular objects. Referencing the social graph 900, social-networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 802 may determine that the user has a higher coefficient with respect to the first photo than the second photo because having a tagged-in-type relationship with content may be assigned a higher weight and/or rating than having a like-type relationship with content. In particular embodiments, social-networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 802 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 806 of the user). A first user may be more interested in other users or concepts that are closer to the first user. As an example and not by way of limitation, if a user is one mile from an airport and two miles from a gas station, social-networking system 802 may determine that the user has a higher coefficient for the airport than the gas station based on the proximity of the airport to the user.

In particular embodiments, social-networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 802 may provide information that is relevant to user's interests and current circumstances, increasing the likelihood that they will find such information of interest. In particular embodiments, social-networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social-networking system 802 may calculate the coefficient (or access the coefficient information if it has previously been calculated and stored). In particular embodiments, social-networking system 802 may measure an affinity with respect to a particular process. Different processes (both internal and external to the online social network) may request a coefficient for a particular object or set of objects. Social-networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or acts disclosed in U.S. patent application Ser. No.

11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social-networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 802 may send a request to the data store for the object. The request may identify the user associated with the request and may only be sent to the user (or a client device 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
  receiving, by a digital communication system, an initial term in a source language and at least one translation of the initial term in a target language;
  creating a first hashkey based on the initial term, the source language, and the target language;
  associating the first hashkey with at least one translation identifier within a relational database of the digital communication system, wherein the at least one translation identifier points to the at least one translation of the initial term;
  based on determining to translate a digital communication from the source language to the target language, identifying, within the digital communication, a new term in the source language;
  creating a second hashkey based on the new term, the source language, and the target language; and
  based on determining that the first hashkey corresponds to the second hashkey:
    locating the at least one translation of the initial term using the at least one translation identifier associated with the first hashkey; and
    providing the at least one translation of the initial term as a translation of the new term.

2. The method of claim 1, wherein:
  the at least one translation of the initial term comprises a first translation of the initial term and a second translation of the initial term; and
  the at least one translation identifier within the relational database comprises a first translation identifier that points to the first translation of the initial term and a second translation identifier that points to the second translation of the initial term.

3. The method of claim 2, further comprising:
generating a score for the first translation of the initial term and a score for the second translation of the initial term;
determining that the score for the first translation of the initial term exceeds the score for the second translation of the initial term; and
wherein:
  locating the at least one translation of the initial term comprises locating the first translation of the initial term using the first translation identifier based on determining the score for the first translation exceeds the score for the second translation; and
  providing the at least one translation of the initial term as a translation of the new term comprises providing the first translation of the initial term as the translation of the new term.

4. The method of claim 3, further comprising, based on determining that the score for the first translation exceeds the score for the second translation, designating the first translation of the initial term as a default translation associated with the first hashkey within the relational database.

5. The method of claim 3, further comprising, based on the score for the second translation of the initial term being less than a threshold score, disassociating the second translation identifier that points to the second translation of the initial term from the first hashkey within the relational database.

6. The method of claim 3, wherein generating the scores for the first translation of the initial term and for the second translation of the initial term comprises generating user appraisal scores for the first translation of the initial term and for the second translation of the initial term based on input from a plurality of users of the digital communication system.

7. The method of claim 3, further comprising:
identifying a source of the first translation of the initial term and a source of the second translation of the initial term, wherein each source comprises a professional translation service, a translation machine, or a user of the digital communication system; and
assigning a trust level to the source of the first translation of the initial term and a trust level to the source of the second translation of the initial term.

8. The method of claim 7, wherein generating the scores for the first translation of the initial term and for the second translation of the initial term comprises generating confidence scores for the first translation of the initial term and for the second translation of the initial term based on at least one of the assigned trust levels, a language model, or a translation model.

9. A system comprising:
at least one processor; and
at least one non-transitory computer readable storage medium storing instructions that, when executed by the at least one processor, cause the system to:
receive an initial term in a source language and at least one translation of the initial term in a target language;
create a first hashkey based on the initial term, the source language, and the target language;
associate the first hashkey with at least one translation identifier within a relational database, wherein the at least one translation identifier points to the at least one translation of the initial term;
based on determining to translate a digital communication from the source language to the target language, identify, within the digital communication, a new term in the source language;
create a second hashkey based on the new term, the source language, and the target language;
based on determining that the first hashkey corresponds to the second hashkey:
  locate the at least one translation of the initial term using the at least one translation identifier associated with the first hashkey; and
  provide the at least one translation of the initial term as a translation of the new term.

10. The system of claim 9, wherein the initial term comprises a word or a phrase.

11. The system of claim 9, further comprising instructions that, when executed by the at least one processor, cause the system to:
identify a sentence in the source language within the digital communication; and
identify a first segment and a second segment within the sentence, wherein the first segment and the second segment each comprise a word or a phrase and the new term comprises the word or the phrase of the first segment.

12. The system of claim 11, further comprising instructions that, when executed by the at least one processor, cause the system to:
identify an additional term based on the second segment;
create a third hashkey based on the additional term, the source language, and the target language; and
locate a translation of the additional term using the third hashkey.

13. The system of claim 12, further comprising instructions that, when executed by the at least one processor, cause the system to combine the translation of the new term and the translation of the additional term to generate a translation of the sentence.

14. The system of claim 12, further comprising instructions that, when executed by the at least one processor, cause the system to generate a plurality of translations of the sentence using the translation of the additional term and multiple potential translations corresponding to the first hashkey.

15. The system of claim 14, further comprising instructions that, when executed by the at least one processor, cause the system to:
generate a confidence score for each of the plurality of translations of the sentence based on a trust level associated with a source of each potential translation from the multiple potential translations corresponding to the first hashkey; and
based on determining the confidence scores, provide a translation of the sentence having the highest confidence score from among the plurality of translations of the sentence.

16. The system of claim 9, further comprising instructions that, when executed by the at least one processor, cause the system to:
identify a plurality of segments of a sentence in the source language within the digital communication; and
combine two or more segments of the plurality of segments, wherein the new term comprises a combination of the two or more segments.

17. A non-transitory computer readable medium storing instructions thereon that, when executed by at least one processor, cause a computer system to:

receive an initial term in a source language and at least one translation of the initial term in a target language;

create a first hashkey based on the initial term, the source language, and the target language;

associate the first hashkey with at least one translation identifier within a relational database, wherein the at least one translation identifier points to the at least one translation of the initial term;

based on determining to translate a digital communication from the source language to the target language, identify, within the digital communication, a new term in the source language;

create a second hashkey based on the new term, the source language, and the target language; and based on determining that the first hashkey corresponds to the second hashkey:

locating the at least one translation of the initial term using the at least one translation identifier associated with the first hashkey; and provide the at least one translation of the initial term as a translation of the new term.

18. The non-transitory computer readable medium of claim 17, wherein:

the initial term differs from the new term; and the first hashkey and the second hashkey each comprise a reference term that corresponds to the initial term and the new term.

19. The non-transitory computer readable medium of claim 18, wherein:

creating the first hashkey based on the initial term, the source language, and the target comprises creating the first hashkey comprising the reference term corresponding to the initial term, a source language code that corresponds to the source language, and a target language code that corresponds to the target language; and creating the second hashkey based on the new term, the source language, and the target language comprises creating the second hashkey comprising the reference term corresponding to the new term, the source language code, and the target language code.

20. The non-transitory computer readable medium of claim 17, further comprising instructions that, when executed by the at least one processor, cause the computer system to create a node, within a social graph, that represents and includes the at least one translation of the initial term, wherein the translation identifier points to the node within the social graph.

* * * * *